(12) United States Patent
Erol et al.

(10) Patent No.: US 9,384,619 B2
(45) Date of Patent: Jul. 5, 2016

(54) SEARCHING MEDIA CONTENT FOR OBJECTS SPECIFIED USING IDENTIFIERS

(75) Inventors: Berna Erol, San Jose, CA (US); Jonathan J. Hull, San Carlos, CA (US)

(73) Assignee: Ricoh Co., Ltd., Tokyo (JP)

( * ) Notice: Subject to any disclaimer, the term of this patent is extended or adjusted under 35 U.S.C. 154(b) by 1486 days.

(21) Appl. No.: 11/461,109

(22) Filed: Jul. 31, 2006

(65) Prior Publication Data

US 2008/0027983 A1    Jan. 31, 2008

(51) Int. Cl.
*G06F 17/30* (2006.01)
*G06K 9/00* (2006.01)
*G07F 7/12* (2006.01)
*G06K 9/20* (2006.01)
*G06K 9/62* (2006.01)
*G07F 7/08* (2006.01)
*G07F 7/10* (2006.01)
*G06F 17/00* (2006.01)

(52) U.S. Cl.
CPC ............ *G07F 7/127* (2013.01); *G06K 9/00221* (2013.01); *G06K 9/2054* (2013.01); *G06K 9/629* (2013.01); *G07F 7/08* (2013.01); *G07F 7/1008* (2013.01); *G06K 2009/00328* (2013.01)

(58) Field of Classification Search
CPC .......... G06K 9/00221; G06K 2209/09; G06K 9/00771; G06K 9/00275; G06K 9/00288; G06K 9/00604; G06K 9/00013; G06K 9/00234; G06K 9/00677; G06K 9/00892; G06K 9/00912; G06K 9/00926; G06K 9/00973; G06K 9/036; G06K 9/2018; G06K 9/20

USPC ............... 707/1–10, 104.1, 899; 382/118, 382/115–117; 713/186
See application file for complete search history.

(56) References Cited

U.S. PATENT DOCUMENTS

| 1,915,993 | A | | 6/1933 | Handel |
| 2,612,994 | A | * | 10/1952 | Woodland et al. ............ 209/583 |
| 4,759,075 | A | | 7/1988 | Lipkie et al. |
| 5,010,581 | A | | 4/1991 | Kanno |
| 5,027,421 | A | | 6/1991 | Kanno |
| 5,077,805 | A | | 12/1991 | Tan |

(Continued)

FOREIGN PATENT DOCUMENTS

| CN | 1245935 | 3/2000 |
| EP | 0706283 | 4/1996 |

(Continued)

OTHER PUBLICATIONS

"Automatic Identification and Data Capture", Unknown, Wikipedia Online Encyclopedia, Published: Jul. 21, 2008, pp. 1-2.*

(Continued)

*Primary Examiner* — Yicun Wu
(74) *Attorney, Agent, or Firm* — Patent Law Works LLP

(57) ABSTRACT

Techniques for automatically comparing one or more objects determined from digital media content (e.g., an image, audio information, video information) to one or more objects specified by a machine readable identifier to determine if an object determined from the media content matches an object specified by the machine readable identifier. One or more actions may be initiated upon determining that an object determined from the media content matches an object specified by the machine readable identifier. Information identifying the action to be initiated may also be encapsulated by the machine readable identifier.

17 Claims, 5 Drawing Sheets

(56) References Cited

U.S. PATENT DOCUMENTS

| | | | |
|---|---|---|---|
| 5,109,439 A | 4/1992 | Froessl |
| 5,263,100 A | 11/1993 | Kim et al. |
| 5,392,447 A | 2/1995 | Schlack et al. |
| 5,416,892 A | 5/1995 | Loken-Kim |
| 5,432,864 A | 7/1995 | Lu et al. |
| 5,465,353 A | 11/1995 | Hull et al. |
| 5,546,502 A | 8/1996 | Hart et al. |
| 5,553,217 A | 9/1996 | Hart et al. |
| 5,555,556 A | 9/1996 | Ozaki |
| 5,579,471 A | 11/1996 | Barber et al. |
| 5,706,097 A | 1/1998 | Schelling et al. |
| 5,752,055 A | 5/1998 | Repath |
| 5,754,772 A | 5/1998 | Leaf |
| 5,757,953 A | 5/1998 | Jang |
| 5,761,344 A | 6/1998 | Al-Hussein |
| 5,764,277 A | 6/1998 | Loui et al. |
| 5,806,005 A | 9/1998 | Hull et al. |
| 5,832,474 A | 11/1998 | Lopresti et al. |
| 5,832,530 A | 11/1998 | Paknad et al. |
| 5,842,194 A | 11/1998 | Arbuckle |
| 5,848,184 A | 12/1998 | Taylor et al. |
| 5,867,597 A | 2/1999 | Peairs et al. |
| 5,873,077 A | 2/1999 | Kanoh et al. |
| 5,889,886 A | 3/1999 | Mahoney |
| 5,892,843 A | 4/1999 | Zhou et al. |
| 5,905,502 A | 5/1999 | Deering |
| 5,907,835 A | 5/1999 | Yokomizo et al. |
| 5,918,012 A | 6/1999 | Astiz et al. |
| 5,933,525 A | 8/1999 | Makhoul et al. |
| 5,933,823 A | 8/1999 | Cullen |
| 5,956,468 A | 9/1999 | Ancin |
| 5,968,175 A | 10/1999 | Morishita et al. |
| 5,999,664 A | 12/1999 | Mahoney et al. |
| 5,999,915 A | 12/1999 | Nahan et al. |
| 6,006,240 A | 12/1999 | Handley |
| 6,026,411 A | 2/2000 | Delp |
| 6,035,055 A | 3/2000 | Wang et al. |
| 6,067,369 A | 5/2000 | Kamei |
| 6,104,834 A | 8/2000 | Hull |
| 6,121,969 A | 9/2000 | Jain et al. |
| 6,138,129 A | 10/2000 | Combs |
| 6,192,157 B1 | 2/2001 | Prebble |
| 6,208,771 B1 | 3/2001 | Jared et al. |
| 6,223,171 B1 | 4/2001 | Chaudhuri et al. |
| 6,253,201 B1 | 6/2001 | Abdel-Mottaleb |
| 6,301,386 B1 | 10/2001 | Zhu et al. |
| 6,332,039 B1 | 12/2001 | Bando et al. |
| 6,345,109 B1 * | 2/2002 | Souma .............. G06K 9/6232 382/118 |
| 6,345,274 B1 | 2/2002 | Zhu et al. |
| 6,353,822 B1 | 3/2002 | Lieberman |
| 6,363,381 B1 | 3/2002 | Lee et al. |
| 6,393,142 B1 | 5/2002 | Swain et al. |
| 6,397,213 B1 | 5/2002 | Cullen et al. |
| 6,404,925 B1 | 6/2002 | Foote et al. |
| 6,405,172 B1 | 6/2002 | Baker et al. |
| 6,408,257 B1 | 6/2002 | Harrington et al. |
| 6,411,953 B1 | 6/2002 | Ganapathy et al. |
| 6,430,307 B1 * | 8/2002 | Souma .............. G06K 9/00221 382/118 |
| 6,430,312 B1 | 8/2002 | Huang et al. |
| 6,445,834 B1 | 9/2002 | Rising, III |
| 6,448,979 B1 | 9/2002 | Schena et al. |
| 6,457,026 B1 | 9/2002 | Graham et al. |
| 6,460,036 B1 | 10/2002 | Herz |
| 6,470,094 B1 | 10/2002 | Lienhart et al. |
| 6,470,264 B2 | 10/2002 | Bide |
| 6,504,571 B1 | 1/2003 | Narayanaswami et al. |
| 6,537,324 B1 | 3/2003 | Tabata et al. |
| 6,567,799 B2 | 5/2003 | Sweet et al. |
| 6,574,375 B1 | 6/2003 | Cullen et al. |
| 6,574,644 B2 | 6/2003 | Hsu et al. |
| 6,584,223 B1 | 6/2003 | Shiiyama |
| 6,611,862 B2 | 8/2003 | Riesman |
| 6,625,311 B1 | 9/2003 | Zhu |
| 6,686,970 B1 | 2/2004 | Windle |
| 6,693,649 B1 | 2/2004 | Lipscomb et al. |
| 6,732,915 B1 | 5/2004 | Nelson et al. |
| 6,751,343 B1 | 6/2004 | Ferrell et al. |
| 6,753,883 B2 | 6/2004 | Schena et al. |
| 6,766,363 B1 | 7/2004 | Rothschild |
| 6,781,694 B2 | 8/2004 | Nahum et al. |
| 6,791,605 B1 | 9/2004 | Reele et al. |
| 6,799,201 B1 | 9/2004 | Lee et al. |
| 6,804,332 B1 | 10/2004 | Miner et al. |
| 6,804,659 B1 | 10/2004 | Graham et al. |
| 6,813,381 B2 | 11/2004 | Ohnishi et al. |
| 6,824,057 B2 | 11/2004 | Rathus et al. |
| 6,827,267 B2 | 12/2004 | Rathus et al. |
| 6,830,187 B2 | 12/2004 | Rathus et al. |
| 6,834,804 B2 | 12/2004 | Rathus et al. |
| 6,842,755 B2 | 1/2005 | Maslov |
| 6,843,411 B2 | 1/2005 | Rathus et al. |
| 6,859,909 B1 | 2/2005 | Lerner et al. |
| 6,865,302 B2 | 3/2005 | Chang |
| 6,866,196 B1 | 3/2005 | Rathus et al. |
| 6,874,131 B2 | 3/2005 | Blumberg |
| 6,874,420 B2 | 4/2005 | Lewis et al. |
| 6,882,741 B2 * | 4/2005 | Dobashi .............. G06K 9/00228 382/118 |
| 6,922,699 B2 | 7/2005 | Schuetze et al. |
| 6,929,182 B2 | 8/2005 | Rathus et al. |
| 6,940,491 B2 | 9/2005 | Incertis Carro |
| 6,958,821 B1 | 10/2005 | McIntyre |
| 6,963,358 B2 | 11/2005 | Cohen et al. |
| 6,964,374 B1 | 11/2005 | Djuknic et al. |
| 6,980,962 B1 | 12/2005 | Arganbright et al. |
| 6,981,224 B1 | 12/2005 | Gardner |
| 6,993,573 B2 | 1/2006 | Hunter |
| 6,999,204 B2 | 2/2006 | Mortenson et al. |
| 7,013,289 B2 | 3/2006 | Horn |
| 7,013,309 B2 | 3/2006 | Chakraborty et al. |
| 7,031,965 B1 | 4/2006 | Moriya et al. |
| 7,035,467 B2 | 4/2006 | Nicponski |
| 7,051,086 B2 | 5/2006 | Rhoads et al. |
| 7,054,489 B2 * | 5/2006 | Yamaoka et al. .............. 382/203 |
| 7,062,722 B1 | 6/2006 | Carlin et al. |
| 7,089,487 B2 | 8/2006 | Tsai |
| 7,092,953 B1 | 8/2006 | Haynes |
| 7,134,095 B1 | 11/2006 | Smith et al. |
| 7,136,093 B1 | 11/2006 | Itoh et al. |
| 7,150,021 B1 | 12/2006 | Vajjhala et al. |
| 7,150,399 B2 | 12/2006 | Barrus et al. |
| 7,167,574 B2 | 1/2007 | Kim et al. |
| 7,174,031 B2 | 2/2007 | Rhoads et al. |
| 7,185,274 B1 | 2/2007 | Rubin et al. |
| 7,206,820 B1 | 4/2007 | Rhoads et al. |
| 7,213,101 B1 | 5/2007 | Srinivasan et al. |
| 7,232,057 B2 | 6/2007 | Rathus et al. |
| 7,236,632 B2 | 6/2007 | Erol et al. |
| 7,239,402 B2 | 7/2007 | Soler et al. |
| 7,240,279 B1 | 7/2007 | Chartier et al. |
| 7,249,123 B2 | 7/2007 | Elder et al. |
| 7,251,689 B2 | 7/2007 | Wesley |
| 7,263,205 B2 | 8/2007 | Lev |
| 7,281,199 B1 | 10/2007 | Nicol et al. |
| 7,305,435 B2 | 12/2007 | Hamynen |
| 7,310,769 B1 | 12/2007 | Dash |
| 7,310,779 B2 | 12/2007 | Carro |
| 7,359,094 B1 | 4/2008 | Sayuda |
| 7,362,323 B2 | 4/2008 | Doyle |
| 7,363,580 B2 | 4/2008 | Tabata et al. |
| 7,366,979 B2 | 4/2008 | Spielberg et al. |
| 7,379,627 B2 | 5/2008 | Li et al. |
| 7,386,789 B2 | 6/2008 | Chao et al. |
| 7,392,287 B2 | 6/2008 | Ratcliff, III |
| 7,403,642 B2 | 7/2008 | Zhang et al. |
| 7,406,214 B2 | 7/2008 | Rhoads et al. |
| 7,421,153 B1 | 9/2008 | Ronca et al. |
| 7,421,155 B2 | 9/2008 | King et al. |
| 7,424,541 B2 | 9/2008 | Bourne |
| 7,437,023 B2 | 10/2008 | King et al. |
| 7,450,760 B2 | 11/2008 | Molnar et al. |
| 7,457,825 B2 | 11/2008 | Li et al. |

(56) References Cited

U.S. PATENT DOCUMENTS

| | | | |
|---|---|---|---|
| 7,458,014 B1 | 11/2008 | Rubin et al. | |
| 7,463,270 B2 | 12/2008 | Vale et al. | |
| 7,463,790 B2 * | 12/2008 | Shepherd | F15B 15/2846 358/504 |
| 7,489,415 B2 | 2/2009 | Furuta | |
| 7,509,386 B2 | 3/2009 | Miyashita | |
| 7,546,524 B1 | 6/2009 | Bryar et al. | |
| 7,551,780 B2 | 6/2009 | Nudd et al. | |
| 7,567,262 B1 | 7/2009 | Clemens et al. | |
| 7,585,224 B2 | 9/2009 | Dyke-Wells | |
| 7,587,681 B2 | 9/2009 | Kake et al. | |
| 7,593,605 B2 | 9/2009 | King et al. | |
| 7,593,961 B2 | 9/2009 | Eguchi | |
| 7,613,686 B2 | 11/2009 | Rui | |
| 7,620,254 B2 | 11/2009 | Hahn et al. | |
| 7,623,259 B2 | 11/2009 | Tojo | |
| 7,643,705 B1 | 1/2010 | Erol | |
| 7,647,331 B2 | 1/2010 | Li et al. | |
| 7,653,238 B2 | 1/2010 | Stentiford | |
| 7,668,405 B2 | 2/2010 | Gallagher | |
| 7,676,767 B2 | 3/2010 | Hofmeister et al. | |
| 7,683,933 B2 | 3/2010 | Tanaka | |
| 7,684,622 B2 | 3/2010 | Fisher et al. | |
| 7,702,673 B2 | 4/2010 | Hull | |
| 7,702,681 B2 | 4/2010 | Brewer | |
| 7,707,039 B2 | 4/2010 | King et al. | |
| 7,725,508 B2 | 5/2010 | Lawrence et al. | |
| 7,742,953 B2 | 6/2010 | King et al. | |
| 7,746,376 B2 | 6/2010 | Mendoza et al. | |
| 7,752,534 B2 | 7/2010 | Blanchard et al. | |
| 7,761,436 B2 | 7/2010 | Norton et al. | |
| 7,765,231 B2 | 7/2010 | Rathus et al. | |
| 7,779,355 B1 | 8/2010 | Erol et al. | |
| 7,787,655 B1 | 8/2010 | Cohen | |
| 7,801,845 B1 | 9/2010 | King et al. | |
| 7,809,192 B2 | 10/2010 | Gokurk et al. | |
| 7,812,986 B2 | 10/2010 | Graham et al. | |
| 7,872,669 B2 | 1/2011 | Darrell et al. | |
| 7,882,177 B2 | 2/2011 | Wei et al. | |
| 7,885,955 B2 | 2/2011 | Hull | |
| 7,894,684 B2 | 2/2011 | Monobe et al. | |
| 7,917,554 B2 | 3/2011 | Hull | |
| 7,920,759 B2 | 4/2011 | Hull | |
| 7,930,292 B2 | 4/2011 | Nakajima | |
| 7,946,491 B2 | 5/2011 | Burlan et al. | |
| 7,991,778 B2 | 8/2011 | Hull | |
| 8,005,831 B2 | 8/2011 | Hull | |
| 8,036,441 B2 | 10/2011 | Frank et al. | |
| 8,073,263 B2 | 12/2011 | Hull | |
| 8,086,038 B2 | 12/2011 | Ke | |
| 8,144,921 B2 | 3/2012 | Ke | |
| 8,156,115 B1 | 4/2012 | Erol | |
| 8,156,116 B2 | 4/2012 | Graham | |
| 8,156,427 B2 | 4/2012 | Graham | |
| 8,176,054 B2 | 5/2012 | Moraleda | |
| 8,184,155 B2 | 5/2012 | Ke | |
| 8,195,659 B2 | 6/2012 | Hull | |
| 8,212,832 B2 | 7/2012 | Stefanidis | |
| 8,276,088 B2 | 9/2012 | Ke | |
| 8,326,037 B1 * | 12/2012 | Abitz et al. | 382/181 |
| 8,332,401 B2 | 12/2012 | Hull | |
| 8,335,789 B2 | 12/2012 | Hull et al. | |
| 8,369,655 B2 | 2/2013 | Moraleda et al. | |
| 8,385,589 B2 | 2/2013 | Erol et al. | |
| 8,385,660 B2 | 2/2013 | Moraleda et al. | |
| 8,386,336 B1 | 2/2013 | Fox et al. | |
| 8,600,989 B2 | 12/2013 | Hull et al. | |
| 8,612,475 B2 | 12/2013 | Graham et al. | |
| 8,676,810 B2 | 3/2014 | Moraleda | |
| 8,825,682 B2 | 9/2014 | Kishi et al. | |
| 8,838,591 B2 | 9/2014 | Hull et al. | |
| 8,856,108 B2 | 10/2014 | Erol et al. | |
| 8,868,555 B2 | 10/2014 | Erol et al. | |
| 8,892,595 B2 | 11/2014 | Graham et al. | |
| 8,949,287 B2 | 2/2015 | Hull et al. | |
| 8,965,145 B2 | 2/2015 | Moraleda et al. | |
| 8,989,431 B1 | 3/2015 | Erol et al. | |
| 9,020,966 B2 | 4/2015 | Erol et al. | |
| 9,058,331 B2 | 6/2015 | Graham et al. | |
| 9,063,952 B2 | 6/2015 | Moraleda et al. | |
| 9,063,953 B2 | 6/2015 | Hull et al. | |
| 9,087,104 B2 | 7/2015 | Graham et al. | |
| 9,092,423 B2 | 7/2015 | Moraleda | |
| 9,171,202 B2 | 10/2015 | Hull et al. | |
| 9,176,984 B2 | 11/2015 | Hull et al. | |
| 9,311,336 B2 | 4/2016 | Hull et al. | |
| 2001/0011276 A1 | 8/2001 | Durst, Jr. et al. | |
| 2001/0013546 A1 * | 8/2001 | Ross | 235/382 |
| 2001/0019636 A1 | 9/2001 | Slatter | |
| 2001/0024514 A1 | 9/2001 | Matsunaga | |
| 2001/0037454 A1 | 11/2001 | Botti et al. | |
| 2001/0042030 A1 | 11/2001 | Ito et al. | |
| 2001/0042085 A1 | 11/2001 | Peairs et al. | |
| 2001/0043741 A1 | 11/2001 | Mahoney et al. | |
| 2001/0047373 A1 | 11/2001 | Jones | |
| 2001/0049700 A1 | 12/2001 | Ichikura | |
| 2002/0008697 A1 | 1/2002 | Deering | |
| 2002/0029232 A1 | 3/2002 | Bobrow et al. | |
| 2002/0038430 A1 | 3/2002 | Edwards et al. | |
| 2002/0052872 A1 | 5/2002 | Yada | |
| 2002/0054059 A1 | 5/2002 | Schneiderman | |
| 2002/0063709 A1 | 5/2002 | Gilbert et al. | |
| 2002/0069418 A1 | 6/2002 | Philips | |
| 2002/0073236 A1 | 6/2002 | Helgeson et al. | |
| 2002/0093538 A1 | 7/2002 | Carlin | |
| 2002/0102966 A1 | 8/2002 | Lev et al. | |
| 2002/0118379 A1 | 8/2002 | Chakraborty | |
| 2002/0126905 A1 | 9/2002 | Suzuki et al. | |
| 2002/0129057 A1 | 9/2002 | Spielberg | |
| 2002/0131641 A1 | 9/2002 | Luo et al. | |
| 2002/0145746 A1 | 10/2002 | Mortenson et al. | |
| 2002/0146176 A1 | 10/2002 | Meyers | |
| 2002/0154148 A1 | 10/2002 | Inoue et al. | |
| 2002/0157028 A1 | 10/2002 | Koue et al. | |
| 2002/0159640 A1 | 10/2002 | Vaithillingam et al. | |
| 2002/0161673 A1 | 10/2002 | Lee | |
| 2002/0161747 A1 | 10/2002 | Li et al. | |
| 2002/0191003 A1 | 12/2002 | Hobgood et al. | |
| 2002/0191848 A1 | 12/2002 | Boose et al. | |
| 2002/0194264 A1 | 12/2002 | Uchiyama et al. | |
| 2002/0198789 A1 | 12/2002 | Waldman | |
| 2003/0012428 A1 | 1/2003 | Syeda-Mahmood | |
| 2003/0025714 A1 | 2/2003 | Ebersole et al. | |
| 2003/0026457 A1 | 2/2003 | Nahum | |
| 2003/0030828 A1 | 2/2003 | Soler et al. | |
| 2003/0030835 A1 | 2/2003 | Yoshida et al. | |
| 2003/0063319 A1 | 4/2003 | Umeda et al. | |
| 2003/0063673 A1 | 4/2003 | Riemens et al. | |
| 2003/0069932 A1 | 4/2003 | Hall et al. | |
| 2003/0098877 A1 | 5/2003 | Boegelund | |
| 2003/0110216 A1 | 6/2003 | Althin et al. | |
| 2003/0112930 A1 | 6/2003 | Bosik et al. | |
| 2003/0115481 A1 | 6/2003 | Baird et al. | |
| 2003/0121006 A1 | 6/2003 | Tabata et al. | |
| 2003/0122922 A1 | 7/2003 | Saffer et al. | |
| 2003/0126147 A1 | 7/2003 | Essafi et al. | |
| 2003/0128375 A1 | 7/2003 | Ruhl et al. | |
| 2003/0142106 A1 | 7/2003 | Saund et al. | |
| 2003/0151674 A1 | 8/2003 | Lin | |
| 2003/0152293 A1 | 8/2003 | Bresler et al. | |
| 2003/0169910 A1 | 9/2003 | Reisman et al. | |
| 2003/0169922 A1 | 9/2003 | Kamon | |
| 2003/0179230 A1 | 9/2003 | Seidman | |
| 2003/0187886 A1 | 10/2003 | Hull et al. | |
| 2003/0190094 A1 | 10/2003 | Yokota | |
| 2003/0193530 A1 | 10/2003 | Blackman et al. | |
| 2003/0195883 A1 | 10/2003 | Mojsilovic et al. | |
| 2003/0212585 A1 | 11/2003 | Kyoya et al. | |
| 2004/0012569 A1 | 1/2004 | Hara | |
| 2004/0015495 A1 | 1/2004 | Kim et al. | |
| 2004/0017482 A1 | 1/2004 | Weitman | |
| 2004/0027604 A1 | 2/2004 | Jeran et al. | |
| 2004/0036679 A1 | 2/2004 | Emerson | |
| 2004/0042667 A1 | 3/2004 | Lee et al. | |

(56) References Cited

U.S. PATENT DOCUMENTS

| | | |
|---|---|---|
| 2004/0047499 A1 | 3/2004 | Shams |
| 2004/0102898 A1 | 5/2004 | Yokota |
| 2004/0122811 A1 | 6/2004 | Page |
| 2004/0133582 A1 | 7/2004 | Howard et al. |
| 2004/0139391 A1 | 7/2004 | Stumbo et al. |
| 2004/0143644 A1 | 7/2004 | Berton et al. |
| 2004/0190791 A1 | 9/2004 | Oyabu et al. |
| 2004/0198396 A1 | 10/2004 | Fransioli |
| 2004/0199531 A1 | 10/2004 | Kim et al. |
| 2004/0201706 A1 | 10/2004 | Shimizu et al. |
| 2004/0205347 A1* | 10/2004 | Erol et al. ............. 713/178 |
| 2004/0205466 A1 | 10/2004 | Kuppinger et al. |
| 2004/0215689 A1 | 10/2004 | Dooley et al. |
| 2004/0220898 A1 | 11/2004 | Eguchi et al. |
| 2004/0221244 A1 | 11/2004 | Baldino |
| 2004/0233235 A1 | 11/2004 | Rubin et al. |
| 2004/0238621 A1 | 12/2004 | Beenau et al. |
| 2004/0243514 A1 | 12/2004 | Wankmueller |
| 2004/0260625 A1 | 12/2004 | Usami et al. |
| 2004/0260680 A1 | 12/2004 | Best et al. |
| 2004/0264780 A1* | 12/2004 | Zhang et al. ............. 382/224 |
| 2005/0012960 A1 | 1/2005 | Eden et al. |
| 2005/0021478 A1 | 1/2005 | Gautier et al. |
| 2005/0069291 A1 | 3/2005 | Voss et al. |
| 2005/0080627 A1 | 4/2005 | Hennebert et al. |
| 2005/0080693 A1 | 4/2005 | Foss et al. |
| 2005/0080871 A1 | 4/2005 | Dinh et al. |
| 2005/0084154 A1 | 4/2005 | Li et al. |
| 2005/0086188 A1 | 4/2005 | Hillis et al. |
| 2005/0086224 A1 | 4/2005 | Franciosa et al. |
| 2005/0088684 A1 | 4/2005 | Naito et al. |
| 2005/0089246 A1 | 4/2005 | Luo |
| 2005/0097435 A1 | 5/2005 | Prakash et al. |
| 2005/0100219 A1 | 5/2005 | Berkner et al. |
| 2005/0108406 A1 | 5/2005 | Lee et al. |
| 2005/0111738 A1 | 5/2005 | Iizuka |
| 2005/0114325 A1 | 5/2005 | Liu et al. |
| 2005/0125390 A1 | 6/2005 | Hurst-Hiller et al. |
| 2005/0129293 A1 | 6/2005 | Acharya et al. |
| 2005/0135483 A1 | 6/2005 | Nair |
| 2005/0160115 A1 | 7/2005 | Starkweather |
| 2005/0160258 A1 | 7/2005 | O'Shea et al. |
| 2005/0165747 A1 | 7/2005 | Bargeron et al. |
| 2005/0165784 A1 | 7/2005 | Gomez et al. |
| 2005/0169511 A1 | 8/2005 | Jones |
| 2005/0169520 A1 | 8/2005 | Chen et al. |
| 2005/0182773 A1 | 8/2005 | Feinsmith |
| 2005/0185060 A1 | 8/2005 | Neven |
| 2005/0185225 A1 | 8/2005 | Brawn et al. |
| 2005/0187768 A1 | 8/2005 | Godden |
| 2005/0190273 A1 | 9/2005 | Toyama et al. |
| 2005/0198095 A1 | 9/2005 | Du et al. |
| 2005/0216257 A1 | 9/2005 | Tanabe et al. |
| 2005/0234851 A1 | 10/2005 | King et al. |
| 2005/0240381 A1 | 10/2005 | Seiler et al. |
| 2005/0244059 A1 | 11/2005 | Turski |
| 2005/0256866 A1 | 11/2005 | Lu et al. |
| 2005/0259866 A1 | 11/2005 | Jacobs et al. |
| 2005/0261990 A1 | 11/2005 | Gocht et al. |
| 2005/0262240 A1 | 11/2005 | Drees |
| 2005/0273812 A1 | 12/2005 | Sakai |
| 2005/0288859 A1 | 12/2005 | Golding et al. |
| 2005/0288911 A1 | 12/2005 | Porikli |
| 2005/0289182 A1 | 12/2005 | Pandian et al. |
| 2005/0289447 A1 | 12/2005 | Hadley et al. |
| 2006/0002607 A1 | 1/2006 | Boncyk |
| 2006/0012677 A1 | 1/2006 | Neven et al. |
| 2006/0014317 A1 | 1/2006 | Farnworth |
| 2006/0020630 A1 | 1/2006 | Stager et al. |
| 2006/0023945 A1* | 2/2006 | King et al. ............. 382/173 |
| 2006/0026140 A1* | 2/2006 | King et al. ............. 707/3 |
| 2006/0041605 A1 | 2/2006 | King et al. |
| 2006/0043188 A1 | 3/2006 | Kricorissian |
| 2006/0047639 A1 | 3/2006 | King et al. |
| 2006/0048059 A1 | 3/2006 | Etkin |
| 2006/0053097 A1 | 3/2006 | King et al. |
| 2006/0053101 A1 | 3/2006 | Stuart et al. |
| 2006/0056696 A1 | 3/2006 | Jun et al. |
| 2006/0056697 A1 | 3/2006 | Jun et al. |
| 2006/0061806 A1 | 3/2006 | King et al. |
| 2006/0070120 A1 | 3/2006 | Aoki et al. |
| 2006/0079214 A1 | 4/2006 | Mertama et al. |
| 2006/0080286 A1 | 4/2006 | Svendsen |
| 2006/0082438 A1 | 4/2006 | Bazakos et al. |
| 2006/0085477 A1 | 4/2006 | Phillips et al. |
| 2006/0085735 A1 | 4/2006 | Shimizu |
| 2006/0104515 A1 | 5/2006 | King et al. |
| 2006/0112092 A1 | 5/2006 | Ziou et al. |
| 2006/0114485 A1 | 6/2006 | Sato |
| 2006/0116555 A1 | 6/2006 | Pavlidis et al. |
| 2006/0119880 A1 | 6/2006 | Dandekar et al. |
| 2006/0122884 A1 | 6/2006 | Graham et al. |
| 2006/0122983 A1 | 6/2006 | King et al. |
| 2006/0123347 A1 | 6/2006 | Hewitt et al. |
| 2006/0140475 A1 | 6/2006 | Chin et al. |
| 2006/0140614 A1 | 6/2006 | Kim et al. |
| 2006/0143176 A1 | 6/2006 | Mojsilovic et al. |
| 2006/0147107 A1 | 7/2006 | Zhang et al. |
| 2006/0150079 A1 | 7/2006 | Albornoz et al. |
| 2006/0173560 A1 | 8/2006 | Widrow |
| 2006/0190812 A1 | 8/2006 | Elienby et al. |
| 2006/0192997 A1 | 8/2006 | Matsumoto et al. |
| 2006/0200347 A1 | 9/2006 | Kim et al. |
| 2006/0200480 A1 | 9/2006 | Harris et al. |
| 2006/0200335 A1 | 9/2006 | Thelen et al. |
| 2006/0218225 A1 | 9/2006 | Hee Voon et al. |
| 2006/0227992 A1 | 10/2006 | Rathus et al. |
| 2006/0240862 A1 | 10/2006 | Neven et al. |
| 2006/0251292 A1 | 11/2006 | Gokturk et al. |
| 2006/0251339 A1* | 11/2006 | Gokturk et al. ............. 382/305 |
| 2006/0253439 A1 | 11/2006 | Ren et al. |
| 2006/0253491 A1 | 11/2006 | Gokturk et al. |
| 2006/0262352 A1 | 11/2006 | Hull et al. |
| 2006/0262962 A1 | 11/2006 | Hull et al. |
| 2006/0262976 A1 | 11/2006 | Hart et al. |
| 2006/0264209 A1 | 11/2006 | Atkinson et al. |
| 2006/0285172 A1 | 12/2006 | Hull et al. |
| 2006/0285755 A1 | 12/2006 | Hager et al. |
| 2006/0285772 A1 | 12/2006 | Hull et al. |
| 2006/0286951 A1 | 12/2006 | Nagamoto et al. |
| 2006/0294049 A1 | 12/2006 | Sechrest et al. |
| 2006/0294094 A1 | 12/2006 | King |
| 2007/0003147 A1 | 1/2007 | Viola et al. |
| 2007/0003166 A1 | 1/2007 | Berkner |
| 2007/0006129 A1 | 1/2007 | Cieslak et al. |
| 2007/0019261 A1 | 1/2007 | Chu |
| 2007/0036469 A1 | 2/2007 | Kim et al. |
| 2007/0041642 A1 | 2/2007 | Romanoff et al. |
| 2007/0041668 A1 | 2/2007 | Todaka |
| 2007/0047819 A1 | 3/2007 | Hull et al. |
| 2007/0052997 A1 | 3/2007 | Hull et al. |
| 2007/0053513 A1 | 3/2007 | Hoffberg |
| 2007/0063050 A1 | 3/2007 | Attia et al. |
| 2007/0076922 A1 | 4/2007 | Living et al. |
| 2007/0078846 A1 | 4/2007 | Gulli et al. |
| 2007/0106721 A1 | 5/2007 | Scholter |
| 2007/0115373 A1 | 5/2007 | Gallagher et al. |
| 2007/0118794 A1 | 5/2007 | Hollander et al. |
| 2007/0150466 A1 | 6/2007 | Brave et al. |
| 2007/0165904 A1 | 7/2007 | Nudd et al. |
| 2007/0174269 A1 | 7/2007 | Jing et al. |
| 2007/0175998 A1 | 8/2007 | Lev |
| 2007/0233613 A1 | 10/2007 | Barrus et al. |
| 2007/0236712 A1 | 10/2007 | Li |
| 2007/0237426 A1 | 10/2007 | Xie et al. |
| 2007/0242626 A1 | 10/2007 | Altberg |
| 2007/0271247 A1 | 11/2007 | Best et al. |
| 2007/0276845 A1 | 11/2007 | Geilich |
| 2007/0300142 A1 | 12/2007 | King |
| 2008/0004944 A1 | 1/2008 | Calabria |
| 2008/0009268 A1 | 1/2008 | Ramer et al. |
| 2008/0010605 A1 | 1/2008 | Frank |
| 2008/0037043 A1 | 2/2008 | Hull et al. |
| 2008/0059419 A1 | 3/2008 | Auerbach et al. |

(56) References Cited

U.S. PATENT DOCUMENTS

| | | |
|---|---|---|
| 2008/0071767 A1 | 3/2008 | Grieselhuber et al. |
| 2008/0071929 A1 | 3/2008 | Motte et al. |
| 2008/0078836 A1 | 4/2008 | Tomita |
| 2008/0106594 A1 | 5/2008 | Thurn |
| 2008/0120321 A1 | 5/2008 | Liu |
| 2008/0141117 A1 | 6/2008 | King |
| 2008/0177541 A1 | 7/2008 | Satomura |
| 2008/0229192 A1 | 9/2008 | Gear et al. |
| 2008/0267504 A1 | 10/2008 | Schloter et al. |
| 2008/0275881 A1 | 11/2008 | Conn et al. |
| 2008/0288476 A1 | 11/2008 | Kim et al. |
| 2008/0296362 A1 | 12/2008 | Lubow |
| 2008/0310717 A1 | 12/2008 | Saathoff et al. |
| 2008/0317383 A1 | 12/2008 | Franz et al. |
| 2009/0016564 A1 | 1/2009 | Ke et al. |
| 2009/0016604 A1 | 1/2009 | Ket et al. |
| 2009/0016615 A1 | 1/2009 | Hull et al. |
| 2009/0019402 A1 | 1/2009 | Ke et al. |
| 2009/0059922 A1 | 3/2009 | Appelman |
| 2009/0063431 A1 | 3/2009 | Erol et al. |
| 2009/0067726 A1 | 3/2009 | Erol et al. |
| 2009/0070110 A1 | 3/2009 | Erol et al. |
| 2009/0070302 A1 | 3/2009 | Moraleda et al. |
| 2009/0070415 A1 | 3/2009 | Kishi et al. |
| 2009/0074300 A1 | 3/2009 | Hull et al. |
| 2009/0076996 A1 | 3/2009 | Hull et al. |
| 2009/0080800 A1 | 3/2009 | Moraleda et al. |
| 2009/0092287 A1 | 4/2009 | Moraleda et al. |
| 2009/0100048 A1 | 4/2009 | Hull et al. |
| 2009/0100334 A1 | 4/2009 | Hull et al. |
| 2009/0152357 A1 | 6/2009 | Lei et al. |
| 2009/0228126 A1 | 9/2009 | Spielberg et al. |
| 2009/0235187 A1 | 9/2009 | Kim et al. |
| 2009/0248665 A1 | 10/2009 | Garg et al. |
| 2009/0254643 A1 | 10/2009 | Terheggen et al. |
| 2009/0265761 A1 | 10/2009 | Evanitsky |
| 2009/0285444 A1 | 11/2009 | Erol et al. |
| 2010/0013615 A1 | 1/2010 | Hebert et al. |
| 2010/0040296 A1 | 2/2010 | Ma et al. |
| 2010/0042511 A1 | 2/2010 | Sundaresan et al. |
| 2010/0046842 A1 | 2/2010 | Conwell |
| 2010/0057556 A1 | 3/2010 | Rousso et al. |
| 2010/0063961 A1 | 3/2010 | Guiheneuf et al. |
| 2010/0174783 A1 | 7/2010 | Zarom |
| 2010/0211567 A1 | 8/2010 | Abir |
| 2010/0239175 A1 | 9/2010 | Bober et al. |
| 2010/0306273 A1 | 12/2010 | Branigan et al. |
| 2011/0035384 A1 | 2/2011 | Qiu |
| 2011/0093492 A1 | 4/2011 | Sull et al. |
| 2011/0121069 A1 | 5/2011 | Lindahl et al. |
| 2011/0125727 A1 | 5/2011 | Zou et al. |
| 2011/0167064 A1 | 7/2011 | Achtermann et al. |
| 2011/0173521 A1 | 7/2011 | Horton et al. |
| 2011/0314031 A1 | 12/2011 | Chittar et al. |
| 2012/0166435 A1 | 6/2012 | Graham |
| 2012/0173504 A1 | 7/2012 | Moraleda |
| 2013/0027428 A1 | 1/2013 | Graham et al. |
| 2013/0031100 A1 | 1/2013 | Graham et al. |
| 2013/0031125 A1 | 1/2013 | Graham et al. |
| 2015/0139540 A1 | 5/2015 | Moraleda et al. |
| 2015/0287228 A1 | 10/2015 | Moraleda et al. |
| 2015/0324848 A1 | 11/2015 | Graham et al. |
| 2015/0350151 A1 | 12/2015 | Graham et al. |

FOREIGN PATENT DOCUMENTS

| | | |
|---|---|---|
| EP | 0706283 A | 4/1996 |
| EP | 1229496 | 8/2002 |
| EP | 1229496 A2 | 8/2002 |
| EP | 1555626 A2 | 7/2005 |
| EP | 1662064 A1 | 5/2006 |
| EP | 1783681 | 5/2007 |
| JP | 09-006961 | 1/1997 |
| JP | 9134372 | 5/1997 |
| JP | 10-228468 A | 8/1998 |
| JP | 10-0240765 | 9/1998 |
| JP | 11-234560 | 8/1999 |
| JP | 2000-165645 A | 6/2000 |
| JP | 2000-268179 | 9/2000 |
| JP | 2001-211359 | 8/2001 |
| JP | 2001-230916 | 8/2001 |
| JP | 2002-513480 | 5/2002 |
| JP | 2002521752 | 7/2002 |
| JP | 2003-178081 | 6/2003 |
| JP | 2004-055658 | 2/2004 |
| JP | 2004234656 | 8/2004 |
| JP | 2005-011005 | 1/2005 |
| JP | 2005100274 | 4/2005 |
| JP | 2005157931 | 6/2005 |
| JP | 2005-242579 | 9/2005 |
| JP | 2005-286395 | 10/2005 |
| JP | 2006-053568 | 2/2006 |
| JP | 2006-059351 | 3/2006 |
| JP | 2006-229465 | 8/2006 |
| JP | 2006-6215756 | 8/2006 |
| JP | 2007-072573 | 3/2007 |
| JP | 2007-140613 | 6/2007 |
| JP | 2007-174270 | 7/2007 |
| JP | 2007264992 | 10/2007 |
| WO | WO 99/05658 A1 | 2/1999 |
| WO | WO00/05663 | 2/2000 |
| WO | WO2004/072897 | 8/2004 |
| WO | WO 2004/072897 A2 | 8/2004 |
| WO | WO2005/043270 | 5/2005 |
| WO | WO 2005/043270 A2 | 5/2005 |
| WO | WO2006/092957 | 9/2006 |
| WO | 2007023994 | 3/2007 |
| WO | WO 2007/073347 A1 | 6/2007 |
| WO | WO2008/129373 | 10/2008 |

OTHER PUBLICATIONS

Brassil, J. et al., "Hiding Information in Document Images," Proc. Conf. Information Sciences and Systems (CISS-95), Mar. 1995, Johns Hopkins University, Baltimore, MD, pp. 482-489.

Ho, T.K. et al., "Decision Combination in Multiple Classifier Systems," IEEE Transactions on Pattern Analysis and Machine Intelligence, Jan. 1994, pp. 66-75, vol. 16, No. 1.

Hull, J., "Document Image Skew Detection: Survey and Annotated Bibliography," Document Analysis Systems II, World Scientific, 1998, pp. 40-64.

Khoubyari, S. et al., "Font and Funct on Word Ident ficat on n Document Recogn t on," Computer Vision and Image Understanding, Jan. 1996, pp. 66-74, vol. 63, No. 1.

Kopec, G.E. et al., "Document Image Decoding Using Markov Source Models," IEEE Transactions on Pattern Analysis and Machine Intelligence, Jun. 1994, pp. 602-617, vol. 16, No. 6.

McDonald, G., "Third Voice: Invisible Web Graffiti," PC World, May 18, 1999, [online] [Retrieved on Nov. 14, 2006] Retrieved from the Internet<URL:http://www.pcworld.com/news/article/0,aid,11016,00.asp>.

PCT International Search Report and Written Opinion, PCT/JP2006/316810, Oct. 10, 2006, 9 pages.

PCT International Search Report and Written Opinion, PCT/JP2006/316811, Oct. 10, 2006, 9 pages.

PCT International Search Report and Written Opinion, PCT/JP2006/316812, Oct. 10, 2006, 9 pages.

PCT International Search Report and Written Opinion, PCT/JP2006/316814, Oct. 10, 2006, 11 pages.

Aggarwal, M et al, "On Cosine-fourth and Vignetting Effects in Real Lenses," ICCV Proceedings, IEEE, 2001, vol. 1, pp. 472-479, [online] Retrieved from the Internet<URL: http://www.metaverselab.org/classis/635/reading/aggarwal-iccv.pdf>.

Akenine-Moller, T. et al., "Real-Time Rendering," A.K. Peters, Natick, MA, $2^{nd}$ Edition, 2002, pp. 70-84.

Archive of "Barcodepedia.com—the online barcode database," [online] [Archived by http://archive.org on Jul. 9, 2006; Retrieved on Aug. 18, 2008] Retrieved from the Internet<http://web.archive.org/web/20060709101455/http://en.barcodepedia.com/>.

(56) References Cited

OTHER PUBLICATIONS

Baba, M. et al., "Shadow Removal from a Real Image Based on Shadow Density," Poster at SIGGRAPH2004, Updated Aug. 16, 2004, 4 pages, [online] Retrieved from the Internet<URL:http://www.cv.its.hiroshima-cu.ac.jp/baba/Shadow/poster04-02.pdf>.

Baird, H.S., "Document Image Defect Models and Their Uses," Proc., IAPR $2^{nd}$ International Conference on Document Analysis and Recognition, Tsukuba Science City, Japan, Oct. 20-22, 1993, 7 pages.

Baird, H., "Document Image Defect Models," in Proc. of IAPR Workshop on Syntactic and Structural Pattern Recognition, Murray Hill, NJ, Jun. 1990, Structured Document Image Analysis, Springer-Verlag, pp. 546-556.

Baird, H., "The State of the Art of Document Image Degradation Modeling," in Proc. of the $4^{th}$ IAPR International Workshop on Document Analysis Systems, Rio de Janeiro, Brazil, 2000, pp. 1-16, [online] Retrieved from the Internet<URL:http://www2.parc.xerox.com/istl/members/baird/das00.pas.gz>.

Barney Smith, E.H. et al., "Text Degradations and OCR Training," International Conference on Document Analysis and Recognition 2005, Seoul, Korea, Aug. 2005, 5 pages, [online] Retrieved from the Internet<URL:http://coen.boisestate.edu/EBarneySmith/Papers/ICDAR05_submit.pdf>.

Bouget, J., "Camera Calibration Toolbox for Matlab," Online Source, Updated Jul. 24, 2006, 6 pages, [online] Retrieved from the Internet<URL:http://www.vision.caltech.edu/bougetj/calib_doc/index.html#ref>.

Boukraa, M. et al., "Tag-Based Vision: Assisting 3D Scene Analysis with Radio-Frequency Tags," Jul. 8, 2002, Proceedings of the Fifth International Conference on Information Fusion, Piscataway, N.J., IEEE, Jul. 8-11, 2002, pp. 412-418.

Boyd, S., "EE263: Introduction to Linear Dynamical Systems," Online Lecture Notes, Stanford University, Spring Quarter, 2006-2007, Accessed on Sep. 11, 2006, 4 pages, [online] Retrieved from the Internet<URL:http://www.standford/edu/class/ee263/#lectures>.

"Call for Papers: ICAT 2007," $17^{th}$ International Conference on Artificial Reality and Telexistence, 2007, [Online] [Retrieved on Nov. 4, 2008] Retrieved from the Internet<URL:http://www.idemployee.id.tue.nl/g.w.m.rauterberg/conferences/ICAT2007-CfP.pdf>.

Constantini, R. et al., "Virtual Sensor Design," Proceedings of the SPIE, vol. 5301, 2004, pp. 408-419, Retrieved from the Internet<URL:http://ivrgwww.epfl.ch/publications/cs04.pdf>.

Cover, T.M. et al., "Nearest Neighbor Pattern Classification," IEEE Transactions on Information Theory, Jan. 1967, pp. 21-27, vol. IT-13, No. 1.

Davis, M. et al., "Towards Context-Aware Face Recognition," Proceedings of the 13th Annual ACM International Conference on Multimedia, Nov. 6-11, 2005, pp. 483-486, vol. 13.

Doermann, D. et al., "Progress in Camera-Based Document Image Analysis," Proceedings of the Seventh International Conference on Document Analysis and Recognition, ICDAR 2003, 11 pages, [online] Retrieved from the Internet<URL:http://www.cse.salford.ac.uk/prima/ICDAR2003/Papers/0111_keynote_III_doermann_d.pdf>.

European Partial Search Report, European Application No. EP07015093.3, Dec. 17, 2007, 7 pages.

European Search Report, European Application No. 08159971.4, Nov. 14, 2008, 6 pages.

European Search Report, European Application No. 08160115.5, Nov. 12, 2008, 6 pages.

European Search Report, European Application No. 08160130.4, Nov. 12, 2008, 7 pages.

European Search Report, European Application No. 08160112.2, Nov. 10, 2008, 7 pages.

Ho, T.K. et al., "Evaluation of OCT Accuracy Using Synthetic Data," Proceedings of the $4^{th}$ Annual Symposium on Document Analysis and Information Retrieval, Apr. 24-26, 1995, pp. 413-422. [online] Retrieved from the Internet<URL:http://citeseer.ist.psu.edu/cache/papers/cs/2303/http:zSzzSzcm.bell-labs.comzSzcmzSzcszSzwhozSzhsbzSzeoasd.pdf/ho95evaluation.pdf>.

Hull, J.J. et al., "Paper-Based Augmented Reality," $17^{th}$ International Conference on Artificial Reality and Telexistence, Nov. 1, 2007, pp. 205-209.

Kanungo, T. et al., "A Downhill Simplex Algorithm for Estimating Morphological Degradation Model Parameters," University of Maryland Technical Report, LAMP-RT-066, Feb. 2001, 15 pages, [online] Retrieved from the Internet<URL:http://lampsrv01.umiacs.umd.edu/pubs/TechReports/LAMP_066/LAMP_066.pdf>.

Kanungo, T. et al., "Global and Local Document Degradation Models," Document Analysis and Recognition, 1993, Proceedings of the Second International Conference on Volume, Oct. 20-22, 1993, pp. 730-734.

Khoubyari, S. et al., "Keyword Location and Noisy Document Images," Second Annual Symposium on Document Analysis and Information Retrieval, Las Vegas, NV, Apr. 26-28, 1993, pp. 217-231.

Li, Y. et al., "Validation of Image Defect Models for Optical Character Recognition," IEEE Trans. Pattern Anal. Mach. Intell. 18, 2, Feb. 1996, pp. 99-108, [online] Retrieved from the Internet<URL: http://www.cs.cmu.edu/afs/cs/usr/andrewt/papers/Validate/journal.ps.gz>.

Liang, J. et al., "Flattening Curved Documents in Images," in Proc. of the IEEE Conf. on Computer Vision and Pattern Recognition (CVPR), 2005, 8 pages, [online] Retrieved from the Internet<URL:http://www.cfar.umd.edu/~daniel/daniel_papersfordownload/liang-j_cpvr2005.pdf>.

"Mobile Video Managed Service," Vidiator, 2008, [online] [Retrieved on Aug. 29, 2008] Retrieved from the Internet<URL:http://www.vidiator.com/services/managed_mobile_video.aspx>.

Pavlidis, T., "Effects of Distortions on the Recognition Rate of a Structural OCR System," in Pro. Conf. on Comp. Vision and Pattern Recog., IEEE, Washington, DC, 1983, pp. 303-309.

Sato, T. et al., "High Resolution Video Mosaicing for Documents and Photos by Estimating Camera Motion," Proceedings of the SPIE 5299, 246, 2004, 8 pages, [online] Retrieved from the Internet<URL:http://yokoya.naist.jp/paper/datas/711/spie2004.pdf>.

Schalkoff, R.J., "Syntactic Pattern Recognition (SYNTPR) Overview," Pattern Recognition: Statistical, Structural and Neural Approaces, Jan. 1, 1992, pp. 127-150, vol. 3, Wiley.

Sivic, J. et al., "Video Google: A Text Retrieval Approach to Object Matching in Videos," Proceedings of the Ninth IEEE International Conference on Computer Vision (ICCV 2003), 2-Volume Set, 2003, IEEE, pp. 1-8.=.

Stoyanov, D., "Camera Calibration Tools," Online Source, Updated Aug. 24, 2006, Accessed Aug. 31, 2006, 12 pages, [online] Retrieved from the Internet<URL:http://ubimon.doc.ic.ac.uk/dvs/index.php?m=581>.

Zhang, Z., "A Flexible New Technique for Camera Calibration," IEEE Transactions on Pattern Analysis and Machine Intelligence, Nov. 2000, pp. 1330-1334, vol. 22, No. 11.

Zheng, Q.-F. et al., "Effective and Efficient Object-Based Image Retrieval Using Visual Phases," Proceedings of the $14^{th}$ Annual ACM International Conference on Multimedia, MM'06, Oct. 23-27, 2006, Santa Barbara, CA, pp. 77-80.

Zi, G., "Groundtruth Generation and Document Image Degradation," University of Maryland Language and Media Processing Laboratory Technical report (LAMP-TR-121), May 2005, 72 pages, [online] Retrieved from the Internet<URL:http://lampsrv01.umiacs.umd.edu/pubs/TechReports/LAMPStructural and Neural Approaces, Jan. 1, 1992, pp. 127-150, vol. 3, Wiley.121/LAMPStructural and Neural Approaces, Jan. 1, 1992, pp. 127-150, vol. 3, Wiley.121.pdf>=.

Erol, B. et al., "Linking Multimedia Presentations with Their Symbolic Source Documents: Algorithm and Applications," Nov. 2-8, 2003, pp. 498-507, [Online] [Retrieved on Oct. 15, 2008] Retrieved from the Internet<URL:http://rii.ricoh.com/{hull/pubs/p225_erol.pdf>.

U.S. Appl. No. 10/813,901, filed Mar. 30, 2004, Erol et al.

European Search Report, European Application No. 08160125.4, Oct. 13, 2008, 5 pages.

(56) References Cited

OTHER PUBLICATIONS

European Search Report, European Application No. 06796845.3, Oct. 30, 2008, 12 pages.
European Search Report, European Application No. 06796844.6, Oct. 30, 2008, 12 pages.
European Search Report, European Application No. 06796848.7, Oct. 31, 2008, 12 pages.
European Search Report, European Application No. 06796846.1, Nov. 5, 2008, 11 pages.
European Search Report, European Application No. 07252397, Oct. 15, 2007, 7 pages.
Hull, J.J., "Document Image Matching and Retrieval with Multiple Distortion-Invariant Descriptors," International Association for Pattern Recognition Workshop on Document Analysis Systems, Jan. 1, 1995, pp. 375-396.
Hull, J.J. et al., "Document Image Matching Techniques," Apr. 30, 1997, pp. 31-35, [Online] [Retrieved on May 2, 1997] Retrieved from the Internet<URL:http://rii.ricoch.com/hull/pubs/hull_sdiut97.pdf>.
Hull, J. J., "Document Image Similarity and Equivalence Detection," International Journal on Document Analysis and Recognition, 1998, pp. 37-42, Springer-Verlag.
Microsoft Computer Dictionary, 5$^{th}$ ed., "Hyperlink" Definition, 2002, pp. 260-261.
"Mobile Search Engines," Sonera MediaLab, Nov. 15, 2002, pp. 1-12.
Mukherjea, S. et al., "AMORE: A World Wide Web Image Retrieval Engine," C&C Research Laboratories, NEC USA Inc., Baltzer Science Publishers BV, World Wide Web 2, 1999, pp. 115-132.
Veltkamp, R. et al., "Content-Based Image Retrieval Systems: A Survey," Department of Computing Science, Utrecht University, Oct. 28, 2002, pp. 1-62.
Wikipedia Online Definition, "Optical Character Recognition," Sep. 14, 2008, pp. 1-7, [Online] [Retrieved on Sep. 14, 2008] Retrieved from the Internet<URL:http://en.wikipedia.org/wiki/Optical_character_recognition>.
Archive of Scanbuy Solutions | Optical Intelligence for your Mobile Devices, Scanbuy® Inc., www.scanbuy.com/website/solutions_summary.htm, [Online] [Archived by http://archive.org on Jun. 19, 2006; Retrieved on Mar. 3, 2009] Retrieved from the Internet<URL:http://web.archive.org/web/20060619172549/http://www.scanbuy.com/website/solutions_su . . . >.
Canny, J., "A Computational Approach to Edge Detection," IEEE Transactions on Pattern Analysis and Machine Intelligence, Nov. 1986, pp. 679-714, vol. PAMI-8, No. 6.
Di Stefano, L. et al., "A Simple and Efficient Connected Components Labeling Algorithm," International Conference on Image Analysis and Processing, 1999, pp. 322-327.
Duda, R. O. et al., "Use of the Hough Transformation to Detect Lines and Curves in Pictures," Communications of the ACM, Jan. 1972, pp. 11-15, vol. 15, No. 1.
Erol, B. et al., "Prescient Paper: Multimedia Document Creation with Document Image Matching," 17$^{th}$ International Conference on Pattern Recognition, Aug. 23-26, 2004, Cambridge, UK.
Erol, B. et al., "Retrieval of Presentation Recordings with Digital Camera Images," IEEE Conference on Computer Vision and Pattern Recognition, Jun. 27-Jul. 2, 2004.
Ezaki, N. et al., "Text Detection from Natural Scene Images: Towards a System for Visually Impaired Persons," Proc. of 17th Int. Conf. on Pattern Recognition (ICPR 2004), IEEE Computer Society, Aug. 23-26, 2004, Cambridge, UK, pp. 683-686, vol. II.
Fadoua, D. et al., "Restoring Ink Bleed-Through Degraded Document Images Using a Recursive Unsupervised Classification Technique," Lecture Notes in Computer Science 3872, Document Analysis Systems VII, 7$^{th}$ International Workshop, DAS 2006, Feb. 13-15, 2006, Nelson, New Zealand, Bunke, H. et al. (eds.), pp. 38-49.
Freund, Y. et al., "A Short Introduction to Boosting," Journal of Japanese Society for Artificial Intelligence, Sep. 1999, pp. 771-780, vol. 14, No. 5.
Hjelmas, E. et al., "Face Detection: A Survey," Computer Vision and Image Understanding, 2001, pp. 236-274, vol. 83.
Hull, J.J., "Document Image Matching on CCITT Group 4 Compressed Images," SPIE Conference on Document Recognition IV, Feb. 8, 1997, pp. 82-87.
Jagannathan, L. et al., Perspective Correction Methods for Camera Based Document Analysis, Proc. First Int. Workshop on Camera-based Document Analysis and Recognition, 2005, pp. 148-154.
Jain, A.K. et al., "An Introduction to Biometric Recognition," IEEE Transactions on Circuits and Systems for Video Technology, Jan. 2004, pp. 4-20, vol. 14, No. 1.
Po, L-M. et al., "A Novel Four-Step Search Algorithm for Fast Block Motion Estimation," IEEE Transactions on Circuits and Systems for Video Technology, Jun. 1996, pp. 313-317, vol. 6, Issue 3.
Rangarajan, K. et al. "Optimal Corner Detector," 1988, IEEE, pp. 90-94.
Rosin, P.L. et al., "Image Difference Threshold Strategies and Shadow Detection," Proceedings of the 6$^{th}$ British Machine Vision Conference, 1995, 10 pages.
Sezgin, M. et al., "Survey Over Image Thresholding Techniques and Quantitative Performance Evaluation," Journal of Electronic Imaging, Jan. 2004, pp. 146-165, vol. 13, No. 1.
Triantafyllidis, G.A. et al., "Detection of Blocking Artifacts of Compressed Still Images," Proceedings of the 11$^{th}$ International Conference on Image Analysis and Processing (ICIAP '01), IEEE, 2001, pp. 1-5.
U.S. Appl. No. 10/696,735, filed Oct. 28, 2003, Erol, B. et al., "Techniques for Using a Captured Image for the Retrieval of Recorded Information," 58 pages.
Zanibbi, R. et al. "A Survey of Table Recognition," International Journal on Document Analysis and Recognition, 2004, pp. 1-33.
Zhao, W. et al., Face Recognition: A Literature Survey, ACM Computing Surveys (CSUR), 2003, pp. 399-458, vol. 35, No. 4.
European Search Report, European Application No. 09156089.6, Jun. 19, 2009, 8 pages.
Marques, O. et al., "Content-Based Image and Video Retrieval, Video Content Representation, Indexing, and Retrieval, a Survey of Content-Based Image Retrieval Systems, CBVQ (Content-Based Visual Query)," Content-Based Image and Video Retrieval [Multimedia Systems and Applications Series], Apr. 1, 2002, pp. 15-117, vol. 21, Kluwer Academic Publishers Group, Boston, USA.
JP Office Action for JP Patent Application No. 2009-119205 dated Feb. 19, 2013, 2 pages.
U.S. Appeal Decision, U.S. Appl. No. 11/461,164, dated Feb. 27, 2013, 10 pages.
U.S. Appeal Decision, U.S. Appl. No. 11/461,147, dated Mar. 4, 2013, 11 pages.
US Non-Final Office Action for U.S. Appl. No. 12/060,200, dated Mar. 22, 2013, 47 pages.
US Final Office Action for U.S. Appl. No. 11/461,279 dated Mar. 25, 2013, 36 pages.
US Non-Final Office Action for U.S. Appl. No. 12/060,198 dated Apr. 2, 2013, 56 pages.
US Notice of Allowance for U.S. Appl. No. 13/415,228 dated Apr. 30, 2013, 10 pages.
US Notice of Allowance for U.S. Appl. No. 12/210,519 dated May 1, 2013, 24 pages.
US Notice of Allowance for U.S. Appl. No. 13/273,189 dated May 9, 2013, 11 pages.
US Notice of Allowance for U.S. Appl. No. 11/461,300 dated May 15, 2013, 13 pages.
US Final Office Action for U.S. Appl. No. 13/273,186, dated Jun. 12, 2013, 24 pages.
US Non-Final Office Action for U.S. Appl. No. 11/461,037, dated Jun. 24, 2013, 25 pages.
US Non-Final Office Action for U.S. Appl. No. 12/719,437, dated Jun. 25, 2013, 22 pages.
US Notice of Allowance for U.S. Appl. No. 11/461,279, dated Jul. 31, 2013, 14 pages.
JP Office Action for JP Application No. 2009212242 dated Jul. 16, 2013, 2 pages.
US Non-Final Office Action for U.S. Appl. No. 11/461,085, dated Jul. 9, 2013, 11 pages.
European Office Action for Application No. 08 252 377.0, dated Aug. 9, 2013, 5 pages.
European Search Report for Application No. 12159375.0 dated Sep. 12, 2013, 9 pages.

(56) References Cited

OTHER PUBLICATIONS

Non-Final Office Action for U.S. Appl. No. 12/060,198, dated Nov. 7, 2013, 55 pages.
Final Office Action for U.S. Appl. No. 12/060,200, dated Nov. 8, 2013, 58 pages.
Non-Final Office Action for U.S. Appl. No. 13/273,186, dated Dec. 5, 2013, 25 pages.
Final Office Action for U.S. Appl. No. 11/461,085, dated Dec. 10, 2013, 16 pages.
Non-Final Office Action for U.S. Appl. No. 13/729,458, dated Dec. 17, 2013, 8 pages.
Non-Final Office Action for U.S. Appl. No. 12/253,715, dated Dec. 19, 2013, 38 pages.
Notice of Allowance for U.S. Appl. No. 12/240,596, dated Dec. 23, 2013, 10 pages.
Final Office Action for U.S. Appl. No. 11/461,164, dated Dec. 26, 2013, 17 pages.
Final Office Action for U.S. Appl. No. 13/330,492, dated Jan. 2, 2014, 15 pages.
Final Office Action for U.S. Appl. No. 12/719,437, dated Jan. 16, 2014, 22 pages.
Non-Final Office Action for U.S. Appl. No. 13/789,669, dated Jan. 17, 2014, 6 pages.
Final Office Action for U.S. Appl. No. 13/192,458, dated Jan. 27, 2014, 13 pages.
Non-Final Office Action for U.S. Appl. No. 12/340,124, dated Jan. 29, 2014, 24 pages.
Non-Final Office Action for U.S. Appl. No. 13/330,492, dated Aug. 27, 2013, 14 pages.
Non-Final Office Action for U.S. Appl. No. 11/461,164, dated Aug. 30, 2013, 19 pages.
Non-Final Office Action for U.S. Appl. No. 12/240,596, dated Sep. 5, 2013, 17 pages.
Notice of Allowance for U.S. Appl. No. 13/273,189, dated Sep. 13, 2013, 15 pages.
Non-Final Office Action for U.S. Appl. No. 11/461,147, dated Sep. 27, 2013, 15 pages.
Non-Final Office Action for U.S. Appl. No. 12/210,532, dated Oct. 7, 2013, 18 pages.
Non-Final Office Action for U.S. Appl. No. 12/247,205, dated Oct. 7, 2013, 19 pages.
Final Office Action for U.S. Appl. No. 11/461,037, dated Oct. 24, 2013, 24 pages.
Chi-Hung Chi et al., Context Query in Information Retrieval, dated 2002, Proceedings of the 14th IEEE International Conference on Tools with Artificial Intelligence (ICTAI'02) 6 pages (http://ieeexplore.ieee.org/stamp/stamp.jsp?tp=&arnumber=1180793).
Hirokazu Kate et al., A Registration Method for Augmented Reality based on Matching Templates Generated from Texture Image, Transaction for the Virtual Reality Society of Japan, The Virtual Reality Society of Japan, 2002, vol. 7, No. 2, pp. 119-128.
Japanese Office Action, JP2008-180790, dated May 22, 2012, 3 pages.
Japanese Office Action, JP2008-180791, dated May 22, 2012, 4 pages.
Japanese Office Action, JP2008-180792, dated May 22, 2012, 3 pages.
Japanese Office Action, JP2008-180793, dated May 29, 2012, 3 pages.
Japanese Office Action, JP2008-180794, dated May 22, 2012, 3 pages.
United States Final Office Action, U.S. Appl. No. 12/247,205, dated May 23, 2012, 16 pages.
United States Final Office Action, U.S. Appl. No. 12/210,532, dated Jun. 5, 2012, 19 pages.
United States Non-Final Office Action, U.S. Appl. No. 11/461,037, dated Jun. 13, 2012, 21 pages.
United States Final Office Action, U.S. Appl. No. 12/240,596, dated Jun. 14, 2012, 17 pages.
United States Non-Final Office Action, U.S. Appl. No. 12/340,124, dated Jun. 27, 2012, 17 pages.
United States Final Office Action, U.S. Appl. No. 12/210,519, dated Jun. 28, 2012, 12 pages.
United States Final Office Action, U.S. Appl. No. 12/491,018, dated Jun. 28, 2012, 7 pages.
United States Final Office Action, U.S. Appl. No. 11/461,300, dated Jul. 13, 2012, 19 pages.
United States Notice of Allowance, U.S. Appl. No. 11/461,294, dated Aug. 9, 2012, 22 pages.
United States Final Office Action, U.S. Appl. No. 11/461,279, dated Aug. 10, 2012, 39 pages.
United States Notice of Allowance, U.S. Appl. No. 11/461,286, dated Aug. 14, 2012, 3 pages.
Non-Final Office Action for U.S. Appl. No. 13/933,078, dated Mar. 17, 2014, 9 pages.
Notice of Allowance for U.S. Appl. No. 13/273,186, dated Mar. 26, 2014, 9 pages.
Notice of Allowance for U.S. Appl. No. 11/461,037, dated Apr. 3, 2014, 10 pages.
Non-Final Office Action for U.S. Appl. No. 12/060,200, dated Apr. 8, 2014, 65 pages.
Non-Final Office Action for U.S. Appl. No. 11/461,085, dated Apr. 9, 2014, 16 pages.
Final Office Action for U.S. Appl. No. 11/461,147, dated Apr. 24, 2014, 11 pages.
Notice of Allowance for U.S. Appl. No. 12/210,511, dated Apr. 30, 2014, 11 pages.
Final Office Action for U.S. Appl. No. 12/247,205, dated May 13, 2014, 17 pages.
Notice of Allowance for U.S. Appl. No. 12/210,540, dated May 22, 2014, 20 pages.
Final Office Action for U.S. Appl. No. 13/729,458, dated Jun. 2, 2014, 8 pages.
Non-Final Office Action for U.S. Appl. No. 13/192,458, dated Jun. 5, 2014, 12 pages.
Final Office Action for U.S. Appl. No. 12/060,198, dated Jun. 5, 2014, 63 pages.
Josef Sivic, "Video Google: A Text Retrieval Approach to Object Matching in Videos," IEEE, Proceedings of the Ninth IEEE International Conference on Computer Vision (ICCV 2003), 8 pages, vol. 2.
Japanese Office Action for JP Application No. 2013222652, dated May 20, 2014, 5 pages.
Japanese Office Action for JP Application No. 2013222655, dated May 20, 2014, 4 pages.
Adobe Acrobat Advanced Elements (for both PC and Mac Computers), 2002, pp. 1-19.
A. Antonacopoulos et al., Flexible Page Segmentation Using the Background, Proceedings of the IAPR International Conference on Pattern Recognition, Jerusalem, Oct. 9-12, 1994; pp. 339-344.
Baird, H. et al., Structured Document Image Analysis;1992; pp. 546-556, Springer-Verlag Berlin Heidelberg.
Chinese Office Action, Chinese Application No. 200910138044, Jan. 26, 2011, 6 pages.
U.S. Office Action, U.S. Appl. No. 11/461,037, Mar. 30, 2011, 16 pages.
U.S. Office Action, U.S. Appl. No. 11/461,037, Mar. 4, 2010, 16 pages.
U.S. Office Action, U.S. Appl. No. 11/461,037, Nov. 23, 2011, 17 pages.
U.S. Supplemental Final Office Action, U.S. Appl. No. 11/461,109, Oct. 23, 2009, 22 pages.
U.S. Office Action, U.S. Appl. No. 11/461,279, Aug. 5, 2010, 35 pages.
U.S. Office Action, U.S. Appl. No. 11/461,279, Feb. 19, 2010, 33 pages.
U.S. Office Action, U.S. Appl. No. 11/461,279, Jan. 7, 2011, 36 pages.
U.S. Office Action, U.S. Appl. No. 11/461,279, Jul. 8, 2011, 37 pages.
U.S. Office Action, U.S. Appl. No. 11/461,279, Sep. 17, 2009, 25 pages.
U.S. Office Action, U.S. Appl. No. 11/461,286, Aug. 5, 2010, 26 pages.
U.S. Office Action, U.S. Appl. No. 11/461,286, Feb. 19, 2010, 23 pages.
U.S. Office Action, U.S. Appl. No. 11/461,286, Jan. 20, 2012, 27 pages.
U.S. Office Action, U.S. Appl. No. 11/461,286, Jan. 21, 2011, 26 pages.

(56) References Cited

OTHER PUBLICATIONS

U.S. Office Action, U.S. Appl. No. 11/461,286, Jul. 15, 2011, 38 pages.
U.S. Office Action, U.S. Appl. No. 11/461,286, Sep. 17, 2009, 22 pages.
Hull, J.J. et al., Visualizing Multimedia Content on Paper Documents: Components of Key Frame Selection for Video Paper, Proceedings of the Seventh International Conference on Document Analysis and Recognition (ICDAR'03), IEEE, 2003, 4 pages.
Japanese Office Action, Japanese Application No. 2004-293962, Aug. 24, 2010, 3 pages.
Japanese Office Action, Japanese Application No. 2008-008112, Oct. 17, 2011, 3 pages.
Liu, T. et al., A Fast Image Segmentation Algorithm for Interactive Video Hotspot Retrieval, IEEE, 2001, pp. 3-8.
Liu, Y. et al., Automatic Texture Segmentation for Texture-Based Image Retrieval, Proceedings of the 10th International Multimedia Modelling Conference (MMM'04), IEEE, Jan. 5-7, 2004, pp. 285-288.
Mae et al., Object Recognition Using Appearance Models Accumulated into Environment, Proc. 15-th Intl. Conf. on Pattern Recognition, 2000, vol. 4, pp. 845-848.
Rademacher, View-Dependent Gemoetry, Computer Graphics Proceedings, Annual Conference Series, SIGGRAPH 99, Los Angeles, California Aug. 8-13, 1999, pp. 439-446.
Reniers et al., Skeleton-based Hierarchical Shape Segmentation, IEEE International Conference on Shape Modeling an Applications, SMI'07, Jun. 1, 2007, Computer Society, pp. 179-188.
Roth, M.T. et al., the Garlic Project, Proc. of the 1996 ACM SIGMOD International Conference on Management of Data, Montreal, Quebec, Canada, Jun. 4, 1996, pp. 557.
U.S. Office Action, U.S. Appl. No. 13/273,189, dated Nov. 28, 2012, 26 pages.
U.S. Office Action, U.S. Appl. No. 13/273,186, dated Dec. 17, 2012, 28 pages.
U.S. Office Action, U.S. Appl. No. 11/461,279, dated Dec. 19, 2012, 31 pages.
U.S. Notice of Allowability, U.S. Appl. No. 12/240,590, dated Dec. 20, 2012, 4 pages.
U.S. Office Action, U.S. Appl. No. 11/461,037, dated Jan. 7, 2013, 21 pages.
U.S. Appeal Decision, U.S. Appl. No. 11/461,085, dated Jan. 23, 2013, 8 pages.
U.S. Office Action, U.S. Appl. No. 12/340,124, dated Jan. 23, 2013, 23 pages.
U.S. Notice of Allowance, U.S. Appl. No. 13/415,756, dated Feb. 4, 2013, 7 pages.
U.S. Office Action, U.S. Appl. No. 12/060,206, dated Feb. 8, 2013, 16 pages.
Non-Final Office Action for U.S. Appl. No. 12/253,715, dated Jan. 7, 2015, 35 pages.
Notice of Allowance for U.S. Appl. No. 13/192,458, dated Jan. 28, 2015, 9 pages.
Final Office Action for U.S. Appl. No. 13/494,008, dated Feb. 10, 2015, 20 pages.
Non-Final Office Action for U.S. Appl. No. 13/933,078, dated Feb. 26, 2015, 7 pages.
Final Office Action for U.S. Appl. No. 11/461,164, dated Mar. 12, 2015, 19 pages.
Non-Final Office Action for U.S. Appl. No. 12/060,198, dated Mar. 13, 2015, 22 pages.
Notice of Allowance for U.S. Appl. No. 13/789,669, dated Mar. 16, 2015, 8 pages.
Non-Final Office Action for U.S. Appl. No. 11/461,147, dated Mar. 20, 2015, 11 pages.
U.S. Office Action, U.S. Appl. No. 11/461,300, Feb. 23, 2012, 15 pages.
U.S. Office Action, U.S. Appl. No. 11/461,300, Jun. 11, 2010, 17 pages.
U.S. Office Action, U.S. Appl. No. 11/461,300, Oct. 6, 2010, 17 pages.
U.S. Office Action, U.S. Appl. No. 12/060,206, Dec. 15, 2011, 9 pages.
U.S. Office Action, U.S. Appl. No. 12/059,583, Jan. 26, 2012, 29 pages.
U.S. Office Action, U.S. Appl. No. 12/060,198, Sep. 1, 2011, 48 pages.
U.S. Office Action, U.S. Appl. No. 12/060,200, Sep. 2, 2011, 27 pages.
U.S. Office Action, U.S. Appl. No. 12/121,275, Apr. 20, 2011, 14 pages.
U.S. Office Action, U.S. Appl. No. 12/121,275, Oct. 19, 2011, 16 pages.
U.S. Office Action, U.S. Appl. No. 12/210,511, Apr. 4, 2011, 20 pages.
U.S. Office Action, U.S. Appl. No. 12/210,511, Sep. 28, 2011, 17 pages.
U.S. Office Action, U.S. Appl. No. 12/210,519, Jan. 5, 2012, 11 pages.
U.S. Office Action, U.S. Appl. No. 12/210,519, Jun. 16, 2011, 12 pages.
U.S. Office Action, U.S. Appl. No. 12/210,519, Mar. 14, 2011, 13 pages.
U.S. Office Action, U.S. Appl. No. 12/210,532, Oct. 31, 2011, 15 pages.
U.S. Office Action, U.S. Appl. No. 12/210,540, Oct. 14, 2011, 13 pages.
U.S. Office Action, U.S. Appl. No. 12/240,596, Aug. 6, 2010, 15 pages.
U.S. Office Action, U.S. Appl. No. 12/240,596, Feb. 2, 2012, 17 pages.
Non-Final Office Action for U.S. Appl. No. 14/604,619, dated Oct. 7, 2015, Moraleda et al., 9 pages.
Final Office Action for U.S. Appl. No. 13/330,492, dated Oct. 8, 2015, Graham et al., 20 pages.
Final Office Action for U.S. Appl. No. 12/060,198, dated Oct. 8, 2015, Erol et al., 32 pages.
Non-Final Office Action for U.S. Appl. No. 13/914,417, dated Oct. 14, 2015, Erol et al., 18 pages.
Final Office Action for U.S. Appl. No. 11/461,164, dated Nov. 27, 2015, Hull et al., 20 pages.
Notice of Allowance for U.S. Appl. No. 12/247,205, dated Apr. 8, 2015, 15 pages.
Non-Final Office Action for U.S. Appl. No. 13/330,492, dated Apr. 8, 2015, 19 pages.
Notice of Allowance for U.S. Appl. No. 12/719,437, dated Apr. 10, 2015, 16 pages.
Notice of Allowance for U.S. Appl. No. 13/933,078, dated May 16, 2015, 7 pages.
Non-Final Office Action for U.S. Appl. No. 11/461,164, dated Jun. 30, 2015, 20 pages.
Non-Final Office Action for U.S. Appl. No. 12/059,583, dated Jul. 2, 2015, Jonathan J. Hull, 29 pages.
Non-Final Office Action for U.S. Appl. No. 12/060,206, dated Jul. 23, 2015, Berna Erol et al., 23 pages.
Non-Final Office Action for U.S. Appl. No. 13/494,008, dated Aug. 13, 2015, Jonathan J. Hull et al., 21 pages.
U.S. Office Action, U.S. Appl. No. 12/059,583, dated Sep. 10, 2012, 28 pages.
U.S. Notice of Allowance, U.S. Appl. No. 12/240,590, dated Oct. 1, 2012, 6 pages.
U.S. Notice of Allowance, U.S. Appl. No. 12/491,018, dated Oct. 11, 2012, 7 pages.
U.S. Office Action, U.S. Appl. No. 13/192,458, dated Oct. 11, 2012, 16 pages.
U.S. Office Action, U.S. Appl. No. 13/415,756, dated Oct. 26, 2012, 10 pages.
U.S. Office Action, U.S. Appl. No. 12/253,715, dated Nov. 14, 2012, 29 pages.
U.S. Office Action, U.S. Appl. No. 11/461,300, dated Nov. 28, 2012, 23 pages.

(56) References Cited

OTHER PUBLICATIONS

U.S. Notice of Allowance, U.S. Appl. No. 12/121,275, dated Nov. 28, 2012, 17 pages.
JP Office Action, JP Application No. 2008-180789, dated Sep. 25, 2012, 3 pages.
Tomohiro Nakai; Document Image Retrieval Based on Cross-Ration and Hashing IEICE Technical Report; The Institute of Electronics, Information and Communication Engineers; dated Mar. 11, 2005; vol. 104 No. 742; pp. 103-108.
U.S. Office Action, U.S. Appl. No. 13/415,228, dated Dec. 3, 2012, 17 pages.
Notice of Allowance for U.S. Appl. No. 13/729,458, dated Sep. 29, 2014, 8 pages.
Final Office Action for U.S. Appl. No. 13/933,078, dated Oct. 6, 2014, 14 pages.
Notice of Allowance for U.S. Appl. No. 12/060,200, dated Nov. 5, 2014, 8 pages.
Non-Final Office Action for U.S. Appl. No. 13/789,669, dated Nov. 19, 2014, 13 pages.
Final Office Action for U.S. Appl. No. 13/330,492, dated Nov. 26, 2014, 18 pages.
Notice of Allowance for U.S. Appl. No. 12/340,124, dated Dec. 19, 2014, 12 pages.
Yanagisawa Kiyoshi, "Access Control Management System using Face Recognition Technology" Nippon Signal Technical Journal, Japan, The Nippon Signal Co., Ltd., Mar. 1, 2002, vol. 26, No. 1, 9 pages (pp. 21-26).
United States Final Office Action, U.S. Appl. No. 12/719,437, Mar. 1, 2012, 22 pages.
United States Notice of Allowance, U.S. Appl. No. 11/461,126, Mar. 5, 2012, 8 pages.
United States Notice of Allowance, U.S. Appl. No. 11/461,143, Mar. 8, 2012, 2 pages.
Japan Patent Office, Office Action for Japanese Patent Application JP2007-199984, Mar. 13, 2012, 3 pages.
United States Notice of Allowance, U.S. Appl. No. 11/776,530, Mar. 26, 2012, 5 pages.
United States Non-Final Office Action, U.S. Appl. No. 12/240,590, Apr. 4, 2012, 12 pages.
United States Notice of Allowance, U.S. Appl. No. 13/168,638, Apr. 4, 2012, 11 pages.
United States Final Office Action, U.S. Appl. No. 12/265,502, Apr. 5, 2012, 23 pages.
United States Final Office Action, U.S. Appl. No. 12/060,198, Apr. 12, 2012, 48 pages.
United States Final Office Action, U.S. Appl. No. 12/060,200, Apr. 12, 2012, 38 pages.
United States Final Office Action, U.S. Appl. No. 11/461,294, Apr. 13, 2012, 16 pages.
United States Final Office Action, U.S. Appl. No. 11/461,286, Apr. 16, 2012, 30 pages.
United States Non-Final Office Action, U.S. Appl. No. 11/461,279, Apr. 19, 2012, 35 pages.
United States Notice of Allowance, U.S. Appl. No. 11/827,530, Apr. 24, 2012, 21 pages.
China Patent Office, Office Action for Chinese Patent Application CN200680039376.7, Apr. 28, 2012, 11 pages.
United States Non-Final Office Action, U.S. Appl. No. 12/121,275, May 18, 2012, 15 pages.
U.S. Office Action, U.S. Appl. No. 12/240,596, Jan. 21, 2011, 13 pages.
U.S. Office Action, U.S. Appl. No. 12/247,205, Oct. 6, 2011, 10 pages.
U.S. Office Action, U.S. Appl. No. 12/253,715, Aug. 31, 2011, 20 pages.
U.S. Office Action, U.S. Appl. No. 12/265,502, Oct. 14, 2011, 23 pages.
U.S. Office Action, U.S. Appl. No. 12/340,124, Oct. 24, 2011, 22 pages.
U.S. Office Action, U.S. Appl. No. 12/719,437, Dec. 9, 2010, 16 pages.
U.S. Office Action, U.S. Appl. No. 12/879,933, Mar. 2, 2011, 7 pages.
U.S. Office Action, U.S. Appl. No. 12/879,933, Oct. 28, 2011, 15 pages.
Wikipedia Online Encyclopedia, Image Scanner, Last Modified Feb. 9, 2010, pp. 1-9, [Online] [Retrieved on Feb. 13, 2010] Retrieved from the Internet <URL:http://en.wikipedia.org/wiki/Image_scanner>.
Wikipedia Online Encyclopedia, Waypoint, Last Modified Feb. 13, 2010, pp. 1-4, [Online] Retrieved on Feb. 13, 2010] Retrieved from the Internet <URL:http://en.wikipedia.org/wiki/Waypoint>.
Esposito, F. et al., "Machine Learning Methods for Automatically Processing Historical Documents: From Paper Acquisition to XML Transformation," Proceedings of the First International Workshop on Document Image Analysis for Libraries (DIAL '04), IEEE, 2004, pp. 1-8.
Lu, Y. et al., "Document Retrieval from Compressed Images," Pattern Recognition, 2003, pp. 987-996, vol. 36.
Erol, B. et al., Linking Presentation Documents Using Image Analysis, IEEE, Nov. 9-12, 2003, pp. 97-101, vol. 1.
European Search Report, European Application No. 09170045.0, Nov. 24, 2009, 4 pages.
European Summons for Oral Proceedings, European Application No. 07015093.3, Sep. 16, 2011, 4 pages.
Extended European Search Report, Application No. 09178280.5, Aug. 31, 2010, 6 pages.
Extended European Search Report, European Patent Application No. 082523770, May 2, 2011, 6 pages.
Notice of Allowance for U.S. Appl. No. 13/273,186 dated Jul. 10, 2014, 9 pages.
Non-Final Office Action for U.S. Appl. No. 13/330,492 dated Jul. 17, 2014, 16 pages.
Final Office Action for U.S. Appl. No. 12/253,715, dated Jul. 25, 2014, 40 pages.
Final Office Action for U.S. Appl. No. 12/340,124, dated Aug. 21, 2014, 26 pages.
Final Office Action for U.S. Appl. No. 13/789,669 dated Aug. 29, 2014, 9 pages.
Non-Final Office Action for U.S. Appl. No. 13/494,008 dated Sep. 10, 2014, 18 pages.
Non-Final Office Action for U.S. Appl. No. 11/461,164, dated Sep. 15, 2014, 18 pages.
Notice of Allowance for U.S. Appl. No. 11/461,085, dated Sep. 17, 2014, 5 pages.
Moghaddam et al., Visualization and User-Modeling for Browsing Personal Photo Libraries, Mitsubishi Electric Research Laboratories, dated Feb. 2004, 34 pages.
Japanese Application Office Action for JP Publication No. 2013-192033, dated Jun. 24, 2014, 7 pages.
Japanese Application Office Action for JP Publication No. 2013-222655, dated Aug. 26, 2014, 5 pages.
Jonathan Hull, Mixed Media Reality (MMR) A New Method of eP-Fusion, Ricoh Technical Report, Ricoh Company, Ltd., dated Dec. 1, 2007, No. 33, p. 119-125; online search dated Aug. 22, 2013 <URL: http://www.ricoh.com/ja/technology/techreport/33/pdf/A3314.pdf>.
Notice of Allowance for U.S. Appl. No. 12/059,583, dated Jan. 15, 2016, Hull et al., 9 pages.
Notice of Allowance for U.S. Appl. No. 13/330,492, dated Jan. 26, 2016, Graham et al., 8 pages.
Final Office Action for U.S. Appl. No. 12/060,206, dated Feb. 1, 2016, Erol et al., 26 pages.
Notice of Allowance for U.S. Appl. No. 13/494,008, dated Feb. 16, 2016, Hull et al., 15 pages.
Notice of Allowance for U.S. Appl. No. 14/604,619, dated Feb. 18, 2016, Moraleda et al., 8 pages.
Notice of Allowance for U.S. Appl. No. 11/461,164, dated Mar. 29, 2016, Hull et al., 8 pages.
Non-Final Office Action for U.S. Appl. No. 12/060,198, dated Apr. 8, 2016, Erol et al. 35 pages.

* cited by examiner

SEARCHING MEDIA CONTENT FOR OBJECTS SPECIFIED USING IDENTIFIERS

BACKGROUND OF THE INVENTION

The present invention relates generally to processing of digital information, and more particularly to techniques for identifying one or more objects from digital media content and comparing them to one or more objects specified by a machine readable identifier.

Techniques exist for automatically recognizing objects from a document, image, etc. However, conventional object recognition techniques are very computation and time intensive and as a result not reliable. Accordingly, improved object recognition techniques are desired.

BRIEF SUMMARY OF THE INVENTION

Embodiments of the present invention provide techniques for identifying one or more objects from digital media content and comparing them to one or more objects specified by a machine readable identifier In one embodiment, techniques are provided for automatically comparing one or more objects determined from digital media content (e.g., an image, audio information, video information) to one or more objects specified by a machine readable identifier to determine if an object determined from the media content matches an object specified by the machine readable identifier. One or more actions may be initiated upon determining that an object determined from the media content matches an object specified by the machine readable identifier. Information identifying the action to be initiated may also be encapsulated by the machine readable identifier.

According to an embodiment of the present invention, techniques (e.g., methods, systems, and code) are provided for processing digital media content. A first object descriptor is determined from a machine readable identifier, the first object descriptor specifying one or more features of an object. A set of one or more objects is determined from the digital media content. An object descriptor is generated for each object in the set of objects. At least one object descriptor is identified from the object descriptors determined for the set of objects that matches the first object descriptor determined from the machine readable identifier.

According to an embodiment of the present invention, an action may be performed in response to identifying the at least one object descriptor as matching the first object descriptor. In one embodiment, metadata information associated with the first object descriptor may be determined from the machine readable identifier and the action to be performed may be determined based upon the metadata information. The metadata information associated with the first object descriptor may identify the action. The action may be performed using a portion of the metadata information. The action may comprise annotating the digital media content.

In one embodiment, an identifier associated with the first object descriptor is determined from the machine readable identifier. In this embodiment, the first object descriptor determined from the machine readable identifier may specify features of a person. The set of objects determined from the digital media content may comprise one or more persons determined from the digital media content. A spatial location may be determined for a person corresponding to the at least one object descriptor. Performing the action may comprise adding, to the digital media content, information indicative of a spatial location of a person corresponding to the at least one object descriptor in the digital media content, and adding the identifier associated with the first object descriptor to the digital media content.

In one embodiment, metadata information associated with the first object descriptor is determined from the machine readable identifier. In this embodiment, the first object descriptor may specify features of a document fragment and the set of objects determined from the digital media content may comprise one or more document fragments. A spatial location in the digital media content of an object corresponding to the at least one object descriptor is determined. The action performed may comprise annotating the digital media content such that a portion of the metadata information is placed proximal to or overlapping with the spatial location of the object corresponding to the at least one object descriptor.

The digital media content comprises an image, textual information, audio information, or video information, etc., and combinations thereof.

The first object descriptor may be determined from the machine readable by decoding the machine readable identifier. In one embodiment, the machine readable identifier may be a barcode. The barcode may be read using a barcode reader and the first object descriptor may be determined from the barcode. In another embodiment, the machine readable identifier may be stored on a radio frequency identifier (RFID) tag. An RFID reader may be used to read information from the RFID tag and the first object descriptor may be determined from the information read from the RFID tag.

In one embodiment, generating an object descriptor for an object in the set of objects comprises extracting one of more features for the object and generating an object descriptor for the object based upon the extracted one or more features. The one or more features to be extracted for an object from the digital media content may be determined based upon the one or more features specified by the first object descriptor determined from the machine readable identifier. The first object descriptor may be represented in MPEG-7 format. The first object descriptor may specify one or more features of a person, a document fragment, an image, a slide, a motion, or a speech pattern. Determining the set of objects from the digital media content comprises analyzing the digital media content for the one or more features specified by the first object descriptor.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide techniques for automatically comparing one or more objects determined from digital media content (e.g., an image, audio information, video information) to one or more objects specified by a machine readable identifier to determine if an object determined from the media content matches an object specified by the machine readable identifier. One or more actions may be initiated upon determining that an object determined from the media content matches an object specified by the machine readable identifier. Information identifying the action to be initiated may also be encapsulated by the machine readable identifier.

Figure 1A:
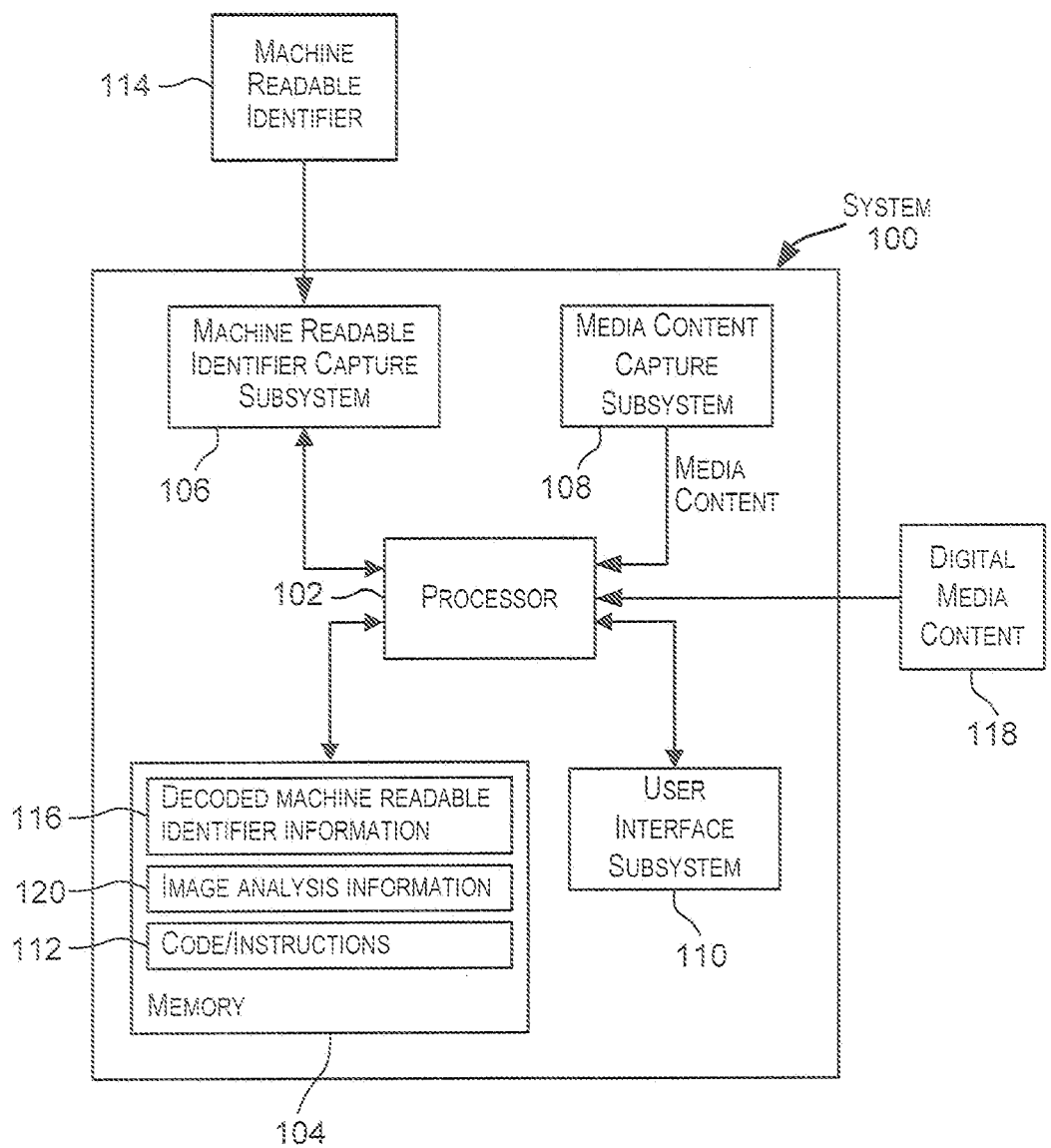
FIGS. 1A and 1B depict simplified block diagrams of a system that may be used to practice an embodiment of the present invention.
Figure 1B:
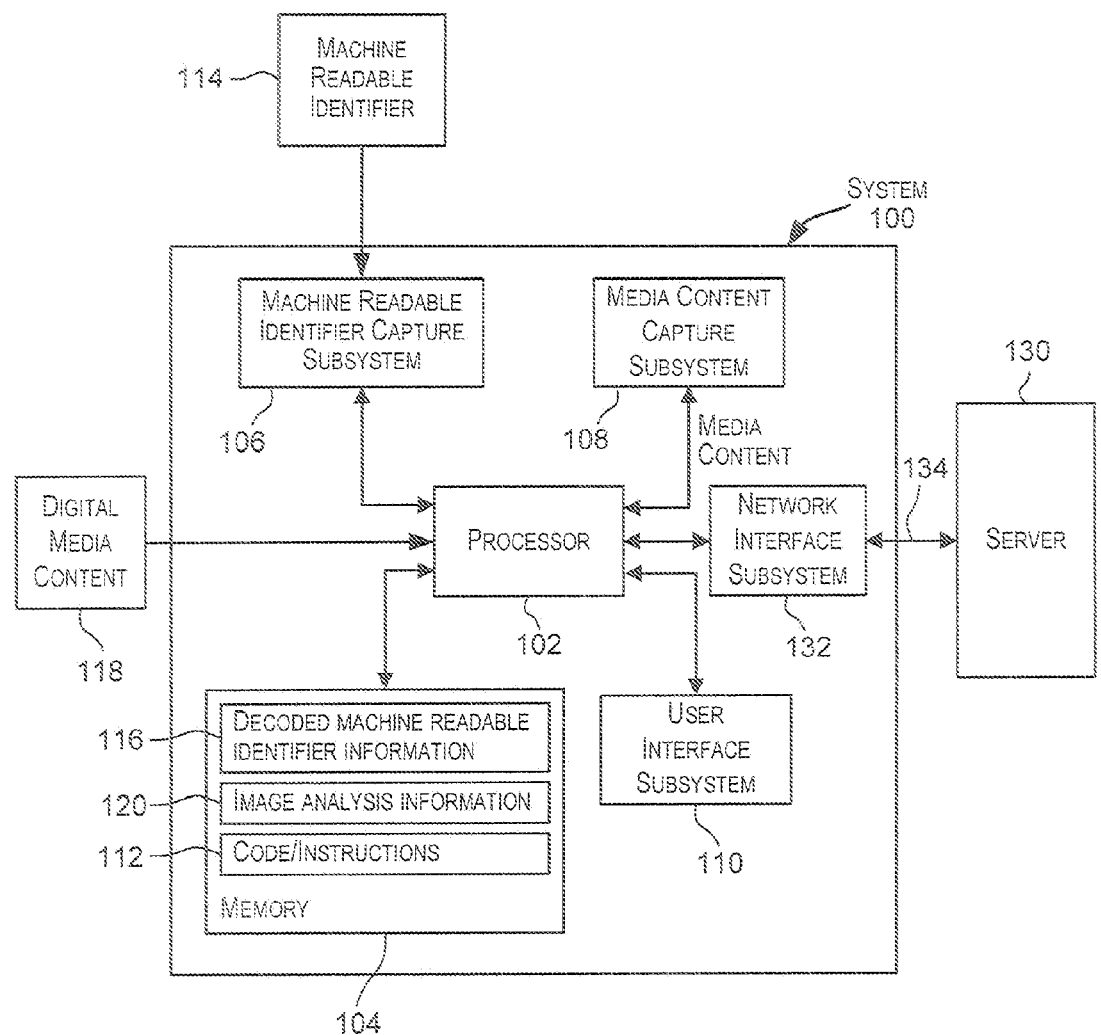

FIGS. 1A and 1B depict simplified block diagrams of a system 100 that may be used to practice an embodiment of the present invention. As depicted in FIG. 1A, system 100 comprises several subsystems including a processor 102, a memory 104, a machine readable identifier capture subsystem 106, a media content capture subsystem 108, and a user interface subsystem 110. Processor 102 may communicate with the other subsystems using one or more buses. The various subsystems depicted in FIG. 1A may be implemented in software, or hardware, or combinations thereof. System 100 depicted in FIG. 1A is merely illustrative of an embodiment incorporating the present invention and does not limit the scope of the invention as recited in the claims. One of ordinary skill in the art would recognize other variations, modifications, and alternatives.

Memory subsystem 104 may be configured to store the basic programming and data constructs that provide the functionality of system 100. For example, software code modules or instructions 112 that provide the functionality of system 100 may be stored in memory 104. These software modules or instructions may be executed by processor 102. Memory 104 may also provide a repository for storing various types of data used in accordance with the present invention. Memory subsystem 104 may include a number of memories including a main random access memory (RAM) for storage of instructions and data during program execution and a read only memory (ROM) in which fixed instructions are stored. Memory subsystem 104 may also include removable media such as an optical disk, a memory card, a memory cartridge, and other storage media.

User interface subsystem 110 enables a user to interact with system 100. For example, a user may use user interface subsystem 110 to input information to system 100. The information may be input via tools such as a mouse, a pointer, a keyboard, a touchscreen, a stylus, or other like input devices. System 100 may also output information using user interface subsystem 110. Output devices may include a screen or monitor, audio information output devices, or other devices capable of outputting information.

System 100 is configured to receive one or more machine readable identifiers 114. A machine readable identifier 114 encapsulates information related to a set of one or more objects. Machine readable identifiers may be embodied in different forms such as barcodes, information stored in radio frequency identifier (RFID) tags, and the like. A machine readable identifier may be provided to system 100, for example, by a user of system 100. Alternatively, system may read a machine readable identifier using machine readable identifier capture subsystem 106. Machine readable identifier capture subsystem 106 may be configured to capture (e.g., read, detect) a machine readable identifier or access it from a memory location accessible to system 100. The components of machine readable identifier capture subsystem 106 and the functions performed by the subsystem may depend upon the types of machine readable identifiers used. For example, for capturing machine readable identifiers that are in the form of barcodes, machine readable identifier capture subsystem 106 may comprise a barcode reader for reading the barcodes. In embodiments where the machine readable identifiers information is stored in RFID tags, then machine readable identifier capture subsystem 106 may comprise a receiver for reading the machine readable identifiers information from the RFID tags.

A machine readable identifier received by system 100 may specify one or more objects. System 100 may be configured to decode the machine readable identifier to extract information encapsulated by the machine readable identifier. The extracted information may comprise information specifying one or more objects. Processing for decoding and extracting the information from a machine readable identifier may be performed by processor 102.

The decoded machine readable identifier information 116 may be stored in memory 104. According to an embodiment of the present invention, the information decoded from a machine readable identifier comprises information identifying one or more object descriptors. An object descriptor identifies an object by specifying one or more features (or characteristics) of the object. Various different types of objects may be specified, possibly for different media content types. Examples of objects include but are not limited to a document fragment (for a digital document content), an image, a slide, a person (for a photograph), a speech pattern (for audio content), a motion (for video content), etc.

The type of features specified by an object descriptor may depend on the type of object being described. In general, the features may describe aspects of the contents of the object or other characteristics of the object being specified. For example, if the object is a face of a person, then the object descriptor may describe visual appearance characteristics of the face. As another example, if the object being specified is a document fragment, then the object descriptor may specify features identifying characteristics of the document fragment such as number of n-grams (e.g., words), color distribution within the doc fragment, white space distribution within the document fragment, color histogram, or other characteristics of the document fragment. As yet another example, if the object being specified is a speech pattern (for audio content), then the object descriptor may specify pre-recorded phonemes characterizing the speech pattern. If the object is a motion object (for video content), then the object descriptor may specify a video sequence or trajectory characterizing the motion (e.g., how a person walks, sign language). Various different standards may be used to specify and process features such as ISO/IEC 15938-3, MPEG-7: Visual, 2002, ISO/IEC 15938-4, MPEG-7: Audio, 2002, ISO/IEC 15938-8, MPEG-7: Extraction and Use of MPEG-7 Description, 2002, the entire contents of which are herein incorporated by reference for all purposes.

Information 116 that is decoded from a machine readable identifier may also comprise metadata information. The metadata information may specify one or more actions to be performed for one or more object descriptors. The metadata information may also comprise information to be used in the performance of the action. The metadata may also comprise other types of information that may be used for a variety of different purposes.

In one embodiment, the metadata information may also be associated with individual object descriptors decoded from the machine readable identifier. The metadata associated with an object descriptor may include additional information associated with the object descriptor. For example, the metadata associated with an individual object descriptor may identify an action to be performed when an object descriptor matching the individual object descriptor has been identified. Examples of metadata information and the types of actions that may be performed are described below.

As previously described, the information decoded from a machine readable identifier may comprise metadata information that may identify an action to be performed for an object descriptor. Various other techniques may also be used to determine an action to be performed for an object descriptor. For example, in some embodiments, the metadata information may not indicate an action(s) but the action(s) to be performed may be inherent or automatically determined based upon the metadata information. In other embodiments, the action to be performed for an object descriptor may also be inherently determined based upon the object descriptor itself and information specified by the object descriptor. In yet other embodiments, a combination of the object descriptor and the metadata information may be used to determine an action to be performed. In yet other embodiments, the action(s) to be performed may preconfigured for different types of objects. It should be apparent that performance of an action is not necessary for the present invention as recited in the claims.

As depicted in FIG. 1A, system 100 receives digital media content 118. Digital media content 118 may be provided to system 100 or may be accessed by system 100 from a memory location accessible to system 100. Examples of digital media content include digital documents, digital photos, images, slides information, audio information, video information, or combinations thereof.

As depicted in FIG. 1A, system 100 comprises a media content capture subsystem 108 that is configured to capture digital information. For example, media content capture subsystem 108 may comprise a camera configured to capture images and photos, a scanner configured to capture scanned media content data, a microphone configured to captured audio information, a video camera configured to capture video information, and the like. The captured media content may be stored in memory 104 from where it can be accessed for subsequent processing or may be forwarded to processor 102 for further processing.

System 100 is configured to analyze the media content and determine a set of one or more objects from the digital media content. In one embodiment, information identifying the type of objects to be determined from the media content may be specified by a user of system 100. The type of objects to be determined may also be determined from the type of media content itself. For example, if the media content is a photograph of people, then system 100 may be configured to automatically extract individual people (or some other object) from the photograph. As another example, if the media content is a document, then system 100 may be configured to automatically determine document fragments (or some other objects such as images, etc.) from the document.

The type of objects to be determined from the digital media content may also be determined from the object descriptors that have been decoded from one or more machine readable identifiers. For example, if the objects descriptors specify faces of people, then faces may automatically be determined from the media content. If the object descriptors specify audio phonemes, then voice patterns may be determined from the media content. In some embodiments, the application context in which processing is performed may also be used to identify the type of objects to be determined from the media content.

Other information related to the objects determined from the media content may also be determined. For example, where appropriate, spatial information for an object determined from the media content may be determined. The spatial information for an object may identify the position of the object in the media content. For example, as previously described, if the media content is a document, then document fragments may be determined from the document and spatial coordinates of the fragments within the document may also be determined. As another example, as previously described, if the media content is a photograph, then people or their faces present in the photograph may be determined from the photograph. For each person or face, spatial information indicating the location of the person or face within the photograph may also be determined. In one embodiment, spatial information for an object may be determined at the time the object is determined from the media content. Alternatively, spatial information for an object may be determined at some later time such as when an action is to be performed for an object.

System 100 is then configured to determine object descriptors for the objects determined from the media content. As part of the processing for generating object descriptors, for each determined object, system 100 may extract features from the object and then generate an object descriptor for the object based upon the extracted features. The features to be extracted from an object may depend upon the type of the object. For example, if the object is a person's face, then facial features may be extracted from the face object and then used to generate an object description for the object.

The features to be extracted from the objects may also be guided by the features described by the object descriptors that have been decoded from a machine readable identifier. For example, assume that a set of object descriptors have been extracted from a machine readable identifier with each object descriptor identifying a document fragment. An object descriptor may identify a document fragment by specifying word lengths occurring in the document fragment. In this embodiment, for a document fragment determined from the media content, system 100 may only extract word lengths from the document fragment. In this manner, for an object determined from the media content, the number of features that are extracted from the object is reduced and limited to the features identified by the object descriptors determined from the machine readable identifier. The object descriptors determined from a machine readable identifier thus reduce the features that have to be extracted from the media content. This simplifies the feature extraction process thereby reducing the memory and computational resources required for the feature extraction. Reduction of the features search space may also increase the accuracy of the feature extraction process.

After extracting features for the objects determined from the media content, system generates an object descriptor for each object based upon the features extracted from that object. The object descriptors generated for the objects determined from the media content are then compared to the object descriptors decoded from the machine readable identifier(s) to find matching object descriptors, if any.

Different techniques may be used to compare the two sets of object descriptors to find matching object descriptors. According to one technique, for each object descriptor in the set of object descriptors generated for objects determined from the media content, a distance metric is calculated for that object descriptor and each object descriptor in the set of object descriptors decoded from a machine readable identifier, where the distance metric between two object descriptors provides a measure of the similarity or matching between the two object descriptors. For any two object descriptors, the distance metric calculated for the pair may then be compared to a preset threshold to determine if the two object descriptors are to be considered as matching. For example, in an embodiment where a lower value for the distance metric identifies a better match, two object descriptors may be considered as matching if the distance metric calculated for the pair is less than the threshold value. Accordingly, system 100 may identify two object descriptors as matching even though they are not exactly similar. A user may thus control the desired amount of similarity required for a match by setting the threshold to an appropriate value.

If an object descriptor from the set of object descriptors generated for the objects determined from the media content matches an object descriptor decoded from the machine readable identifier, it implies that an object determined from the media content and corresponding to the matching object descriptor satisfies or matches the features specified by an object descriptor decoded from the machine readable identifier. Thus, a match indicates that an object described by an object descriptor decoded from the machine readable identifier is found in the objects determined from the media content. A match indicates that an object determined from the media content has features that match features specified by an object descriptor decoded from a machine readable identifier.

Various actions may be initiated for an object descriptor in the set of object descriptors generated for the objects that is identified as matching an object descriptor decoded from the machine readable identifier. As previously described, various techniques may be used for determining the action to be performed. For example, if a specific object descriptor generated for an object determined from the media content is found to match a first object descriptor decoded from an machine readable identifier, then the action to be initiated may be specified by metadata associated with the first object descriptor. Alternatively, the action to be performed may be inherent or automatically determined from the contents of the metadata information associated with the first object descriptor. The action to be initiated may also be determined from the nature of the first object descriptor or a combination of the different techniques. In yet other embodiments, a preconfigured action may be initiated or performed. In some embodiments, actions may also be performed if an object descriptor generated for an object determined from the media content does not match an object descriptor decoded from the machine readable identifier.

Various different types of actions may be initiated or performed. Examples of actions include annotating the media content, performing an action using the media content, updating a database, sending a message, invoking a URL, or other like actions. Metadata information, if any, associated with the matching object descriptor in information 116 decoded from machine readable identifier 114 may be used as part of the action.

For example, assume that a first object descriptor generated for an object determined from document media content is found to match a second object descriptor decoded from an machine readable identifier. Further assume that the metadata associated with the second object descriptor identifies an URI. In this scenario, the action to be performed may be automatically determined and may comprise annotating the document such that the URI associated with the second object descriptor is superimposed, partially overlapped, or placed proximal to the object corresponding to the first object descriptor in the document.

As another example, annotating the media content may comprise identifying the spatial location of an object in an image corresponding to a matching object descriptor and adding that information to the header of the image (e.g., may be added to the JPEG header for the image). In this manner various different actions may be initiated.

In the embodiment depicted in FIG. 1A, system 100 is a standalone system that is configured to perform the processing described above. As described above, system 100 may be configured to receive a machine readable identifier, decode object descriptors from the machine readable identifier, determine one or more objects from digital media content, generate object descriptors for the objects, perform a comparison between object descriptors decoded from the machine readable identifier and object descriptors generated for objects determined from the media content to find any matching object descriptors, and then perform one or more actions for each matching object descriptor. System 100 may be embodied in various forms such as a cellular phone possibly equipped with a camera, a personal data assistant (PDA), a camera, a copier, a scanner, a desktop, a laptop, a multifunction device, or any data processing system that is capable of processing digital information.

In alternative embodiments, the various processing described above may be performed by system 100 in association with one or more other data processing systems. FIG. 1B depicts a simplified block diagram of an embodiment of the present invention wherein the processing is performed by system 100 in association with another data processing system. In the distributed embodiment depicted in FIG. 1B, the processing may be performed in association with a server 130. In this embodiment, system 100 may comprise a network interface subsystem 132 that provides an interface to other computer systems, networks, and devices. Network interface subsystem 132 serves as an interface for receiving data communicated to system 100 and for transmitting data to other systems or networks from system 100 over a network such as the Internet or some other communication network. As shown in FIG. 1B, system 100 may communicate with server 130 via communication link 134. Communication link 134 may be a wireless or wired communication link, a combination thereof, or any other link capable of enabling communication. Different communication protocols may be used to facilitate communication between system 100 and server 130.

For the embodiment depicted in FIG. 1B, the various processing described with respect to FIG. 1A may be performed by system 100 in conjunction with server 130. For example, according to an embodiment of the present invention, system 100 may be configured to read the machine readable identifier and capture digital media content and then communicate the information to server 130 over a network. Server 130 may be configured to perform further processing of the captured machine readable identifier information and analysis of the media content including decoding of the machine readable identifier, analyzing the media content to determine one or more objects from the media content, generating object descriptors for the determined objects, and performing a comparison between the object descriptors generated for objects determined from the media content and object descriptors decoded from a machine readable identifier to identify matching object descriptors, if any. Server 130 may also be configured to initiate actions, if any, upon determining matching object descriptors. The action may be performed by server 130, by system 100, or by some other system. In one embodiment, server 130 may send a signal to system 100 to perform the action.

In another embodiment, the processing of machine readable identifiers, processing of media content, and comparison of object descriptors may be performed by system 100 while the action may be performed by server 130. In yet other embodiments, the actions to be performed may be determined by the server and the information provided to system 100. Various other combinations of the processing steps may be performed in alternative embodiments. Various other data processing systems in addition to system 100 and server 130 may be involved in the processing in other embodiments. In one embodiment, the machine readable identifier information and the digital media content may be received via a network connection via wired or wireless links.

Figure 2:
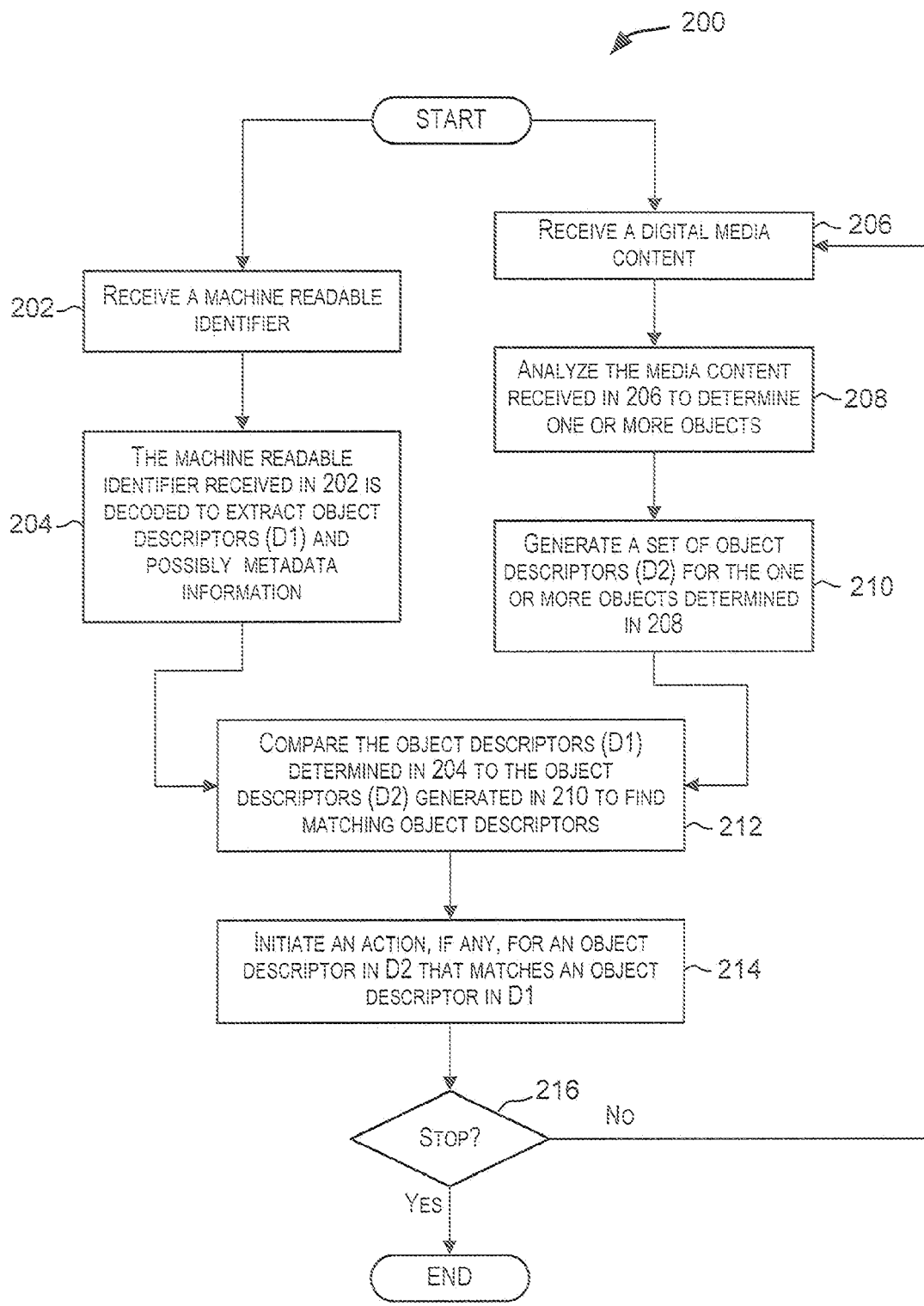
FIG. 2 is a simplified high-level flowchart depicting processing performed according to an embodiment of the present invention.

FIG. 2 is a simplified high-level flowchart 200 depicting processing performed according to an embodiment of the present invention. The processing depicted in FIG. 2 may be performed independently by system 100 (e.g., the embodiment depicted in FIG. 1A) or may be performed by system 100 in association with other systems such as server 130 depicted in FIG. 1B. The processing may be performed by software (code modules or instructions) executed by a processor, hardware modules, or combinations thereof. Flowchart 200 depicted in FIG. 2 is merely illustrative of an embodiment of the present invention and is not intended to limit the scope of the present invention. Other variations, modifications, and alternatives are also within the scope of the present invention. The processing depicted in FIG. 2 may be adapted to work with different implementation constraints.

As depicted in FIG. 2, a machine readable identifier is received by a data processing system such as system 100 depicted in FIG. 1A. (step 202). As previously described, the machine readable identifier may be received in various ways. The machine readable identifier may be provided by a user or system, accessed from a memory store, or captured using a capture device. A machine readable identifier may be embodied in various forms such as a barcode, information stored in an RFID tag, etc. Accordingly, the manner in which the machine readable identifier is received in 202 may depend on the type of machine readable identifier and the apparatus available for capturing the machine readable identifier.

The machine readable identifier received in 202 is decoded to extract object descriptors (D1) and possibly metadata information (step 204). Each decoded object descriptor may identify an object by specifying one or more features (or characteristics) of the object. The metadata information, if any, decoded from the machine readable identifier may be associated with one or more of the decoded object descriptors. The system is then ready for analyzing digital media content.

As shown in FIG. 2, digital media content may be received as input (step 206). The digital media content may be received from different sources. For example, in one embodiment, the digital media content may be captured using capture device such as a camera, a copier, a scanner, a microphone, a video camera, etc. The media content may also be provided by a user or some data processing system. The media content may comprise information of one or more types such as text information, image information, audio information, video information, and combinations thereof.

One or more objects are then determined from the media content received in 206 (step 208). As previously described, various different type of objects may be determined from the media content. Various criteria may control the type of objects to be determined including based upon information provided by a user, from the type of media content, from the context of use, and/or from the information decoded in 204.

A set of object descriptors (D2) are then generated for the one or more objects determined from the digital media content in 208 (step 210). As part of the processing in step 210, features may be extracted from each object determined in 208. An object descriptor may then be generated for an object based upon the features extracted from the object. As previously described, the features to be extracted from an object may depend upon the type of the object. Further, the features to be extracted from the objects may be guided by the features described by the object descriptors decoded from a machine readable identifier in step 204. The features that are extracted for an object may be limited to the features identified by the object descriptors (D1) determined from the machine readable identifier. The object descriptors (D1) thus reduce the features that have to be extracted from the media content. This simplifies the feature extraction process thereby reducing the memory and computational resources required for the feature extraction. Reduction of the features search space may also increase the accuracy of the feature extraction process.

The object descriptors (D1) determined in 204 are then compared to the object descriptors (D2) generated in 210 to find any matching object descriptors (step 212). Different techniques may be used to compare the two sets of object descriptors to find matching object descriptors. As previously described, according to one technique, for each object descriptor in D2, a distance metric is calculated for that object descriptor and each object descriptor in D1, where the distance metric between two object descriptors provides a measure of the similarity or matching between the two object descriptors. The distance metric calculated for the pair may then be compared to a preset threshold to determine if the two object descriptors are to be considered as matching. Accordingly, two object descriptors may be considered as matching even though they are not exactly similar. A user may control the desired amount of similarity required for a match by setting the threshold to an appropriate value.

One or more actions, if any, may then be initiated or performed for an object descriptor in D2 that matches an object descriptor in D1 (step 214). Various techniques may be used to determine whether or not an action(s) is to be initiated for a matching object descriptor in D2. Various different types of actions may be initiated. In one embodiment, for a matching object descriptor in D2, the action to be initiated is specified by metadata associated with the matching object descriptor in D1. The action to be performed may be inherent or automatically determined from the contents of the metadata information associated with matching object descriptor in D1. The action to be initiated may also be determined from the nature of the matching object descriptors or a combination of the different techniques. In yet other embodiments, a preconfigured action may be initiated or performed.

Various different types of actions may be initiated and performed. Various types of information may be used in the performance of the action. For example, metadata information associated with the matching object descriptor in D1 may be used for performing the action. In other embodiment, the media content received in 206 or portions thereof may be used in performing the action. Information related to the object whose object descriptor matches an object descriptor in D1 may also be used for performing the action. For example, spatial information related to the object may be used in performing the action.

After the action has been initiated or performed, a check may be made to determine whether or not to stop processing (step 216). If further processing is to be performed then the flowchart processing continues with step 206 wherein new media content is received for analysis. Else, the processing is terminated.

As described above, a single machine readable identifier may be used to encode information for a collection of objects. The machine readable identifier may encode information identifying one or more object descriptors, each object descriptor identifying an object by identifying features or characteristics of the object. The machine readable identifier may also encode information identifying actions upon finding a matching object descriptor. Per the processing described above, objects determined from the media content are identified whose object descriptors match the object descriptors extracted from the machine readable identifier. Accordingly, objects from the media content are identified whose features match the features specified by the object descriptors decoded from the machine readable identifier. Actions may be performed for matching object descriptors. In this manner, actions may be performed for one or more objects determined from the media content without having to associate the machine readable identifier with the media content.

Since the object descriptors are encoded in the machine readable identifier itself, in one embodiment, the entire processing can be performed by the system by reading the machine readable identifier without requiring access to a server or some other system. For example, as depicted in FIG. 1A, the entire processing may be performed by system 100 which may be a cellular phone, a PDA, a camera, etc. without the help of another system. In alternative embodiments, the processing may be performed by system 100 in association with some other system(s) such as a server, as shown in the embodiment depicted in FIG. 1B.

Further, the object descriptors and other information decoded from a machine readable identifier is used to guide the analysis of the media content. As a result, only specific objects and associated features need to be determined from the media content. This simplifies the process of analyzing the media content to recognize objects from the media content, especially where the media content may have several non-relevant objects. As a result of the simplification, the object determination may be performed using reduced processing and memory resources. Additionally, feature extraction is performed for only those objects that are determined from the media content. Further, only those features specified by object descriptors decoded from the machine readable identifier may be extracted. This simplifies the feature extraction process thereby reducing the memory and computational resources required for the feature extraction. Reduction of the features search space may also increase the accuracy of the feature extraction process. As a result, it may be feasible to run the feature extraction and object determination processes on a low power device such as a cellular phone.

All the objects identified by the object descriptors decoded from the machine readable identifier need not be present in the media content that is analyzed. The media content that is analyzed may comprise none of the objects described by object descriptors decoded from a machine readable identifier, a subset of the objects, or additional objects.

Figure 3:
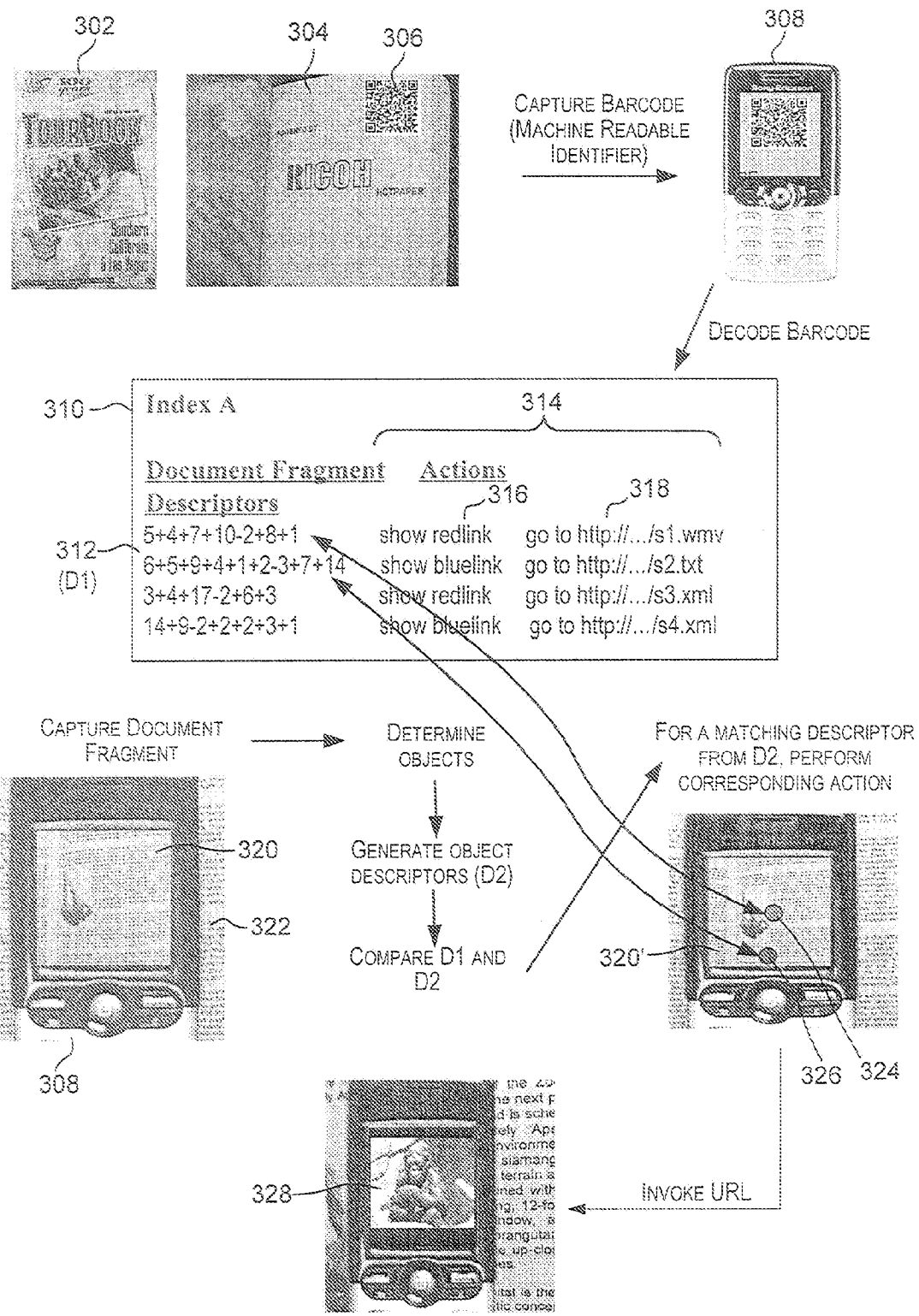
FIG. 3 depicts an example application of an embodiment of the present invention.

Various different applications may be based upon the teachings of the present invention. One such application is depicted in FIG. 3 according to an embodiment of the present invention. In this application, "hot zones" are automatically identified within a document and associated with URLs. A physical document 302 may comprise a page 304 on which is printed a machine readable identifier 306. Document 302 may be any document such as a tour book depicted in FIG. 3. Machine readable identifier 306 depicted in FIG. 3 is in the form of a barcode.

Various different forms of barcodes may be used such as QRCodes+MPEG-7 barcodes. In one embodiment, the capacity of a QRCode is approximately 3000 bytes and is sufficient for representation of object descriptors describing features based upon color histograms, color layouts, shape descriptors (Angular Radial Transform (ART) based, Curvature Scale Space (CSS) based), texture descriptors (Gabor, etc.), Mixed Document Reality (MDR) descriptors (e.g., OCR based, image based), etc. MPEG-7 provides a standard and compressed representation for object descriptors. Applicable standards include ISO/IEC 15938-3, MPEG-7: Visual, 2002, ISO/IEC 15938-4, MPEG-7: Audio, 2002, and ISO/IEC 15938-8, MPEG-7: Extraction and Use of MPEG-7 Description, 2002. In one implementation, approximately 100 bytes may be used for each document fragment descriptor, and as a result up to 300 document fragment descriptors may be described in a document with one machine readable identifier. Machine readable identifier 306 may take different forms in alternative embodiments such as information stored on an RFID tag.

A user may use a device equipped with an appropriate reader to read machine readable identifier 306. For example, as depicted in FIG. 3, a user may use a mobile phone 308 that is equipped with a barcode reader to read and capture barcode 306. In embodiments where the machine readable identifier information is stored on an RFID tag, the reader may user a device equipped with a RFID tag reader to read the machine readable identifier information from the tag.

The machine readable identifier read by phone 308 may then be decoded to extract decoded information 310. Information 310 may comprise information identifying a set of object descriptors 312 (D1). In FIG. 3, the object descriptors specify document fragments, accordingly the object descriptors may also be referred to as document fragment descriptors. Each document fragment descriptor 312 describes a document fragment that is a "hot zone". The object descriptor for each hot zone describes the hot zone based upon features or characteristics associated with the hot zone. In the example depicted in FIG. 3, each object descriptor is a string of word lengths characterizing the hot zone document fragment. Here, the numbers indicate the number of letters in each word. '+' represents the space between two words, and '−' represents a new line. For example, the first object descriptor is "5+4+7+10−2+8+1" identifies an object characterized by a 5 letter word, followed by a space, followed by a 4 letter word, followed by a space, followed by a 7 letter word, followed by a space, followed by a 10 letter word, followed by a new line, followed by a 2 letter word, followed by a space, followed by a 8 letter word, followed by a space, and followed by a 1 letter word. The object descriptor provides a signature for an object. It should be noted that in the embodiment depicted in FIG. 3, the object descriptors do not describe the hot zones based upon locations or positions of the hot zones within a document but rather based upon features or contents of the hot zones. As a result, the application of the object descriptors is not limited to a specific location within a document to be analyzed. Thus, a document fragment identified by an object descriptor can be recognized even if only a part of the document to be analyzed is provided, the whole document need not be provided. The application is also not limited to a specific document or specific media content.

Decoded information 310 may also comprise metadata information 314 associated with object descriptors 312. In the embodiment depicted in FIG. 3, the metadata 314 for each document fragment descriptor 312 identifies an action 316 to be performed when a matching object descriptor is identified, or in other words when an object whose features match the features specified by an object descriptor 312 is identified. In FIG. 3, metadata 314 for each object descriptor 312 also comprises information 318 identifying a URL to be used for performing the action.

While paging through book 302, a user may use camera phone 308 (or some other device) to capture a digital image 320 of a portion of a page 322 in book 302. Digital image 320 corresponds to a document fragment and represents the media content to be searched for objects that match the features specified by object descriptor 312. Image 320 may then be processed to determine objects. In this example, since object descriptors D1 identify document fragments, only document fragments may be determined from image 320. Features may then be extracted from the document fragments. The feature extraction may be limited to word lengths, spaces, and new lines as specified by the object descriptors.

Object descriptors (D2) may then be generated for the objects recognized from image 320. The object descriptors (D2) generated for the objects recognized from image 320 are then compared to object descriptors (D1) decoded from machine readable identifier 306 to find matching object descriptors.

An action is then performed for an object descriptor in D2 that matches an object descriptor in D1. The action that is performed is identified by the metadata associated with the matching object descriptor in D1. In the example depicted in FIG. 3, the action includes annotating image 320 to create annotated image 320' by overlaying a colored marker (e.g., a red or blue marker) on the "hot zone" in image 316 and associating the marker with a specific URL identified by the metadata associated with the matching document fragment descriptor in D1. As part of performing this action, the spatial location of a hot zone in image 320 may be identified and a marker overlaid on, partially, overlapped or placed proximal to the identified hot zone.

In the example depicted in FIG. 3, two object descriptors from D2 are found to match the first and the second object descriptors in D1, i.e., two hot zones are identified in image 320, one matching object descriptor "5+4+7+10–2+8+1" and the other matching object descriptor "6+5+9+4+1+2–3+7+ 14". In the example depicted in FIG. 3, the action to be performed for a matching object descriptor is explicitly specified by the metadata associated with the matching object descriptor in D1 that is extracted from machine readable identifier 306. Accordingly, actions specified by the metadata associated with the two matching object descriptors in D1 are then performed. In the example depicted in FIG. 3, a red link or marker 324, as identified by the metadata associated with first object descriptor in D1, is overlaid on or near the hot zone whose object descriptor matched the first object descriptor in D1 and a blue link or marker 326, as identified by the metadata for second object descriptor is overlaid on or near the hot zone whose object descriptor matched the second object descriptor in D1.

As part of the action, URLs may be associated with the markers. For a particular identified hot zone, the marker overlaid on the hot zone may be associated with a URL specified by the metadata for the corresponding matching object descriptor from D1. One or more of the URLs may also be invoked and displayed. For example, a document 328 corresponding to a URL associated with marker 324 may be invoked and displayed by device 308 (or by some other device or system). In other embodiments, the URL corresponding to a marker may be invoked when a user selects the marker from annotated image 320'.

As the use of RFID tags becomes more prevalent, more and more products will come with RFID tags attached to them. People may also carry RFID tags that store personal identification information. For example, a person may carry an RFID tag that stores biometric information about a person. For example, an RFID tag associated with a person may store one or more object descriptors describing features of the person such as information describing the visual appearance of the person's face. Since the object descriptors describe face features they may also be referred to as face descriptors. A descriptor may also describe other features of a person such as biometric information for the person.

An RFID tag may also store metadata for the person. The metadata may be associated with one or more face descriptors stored in the RFID tag. For example, for a person, the metadata may identify the name of the person. The metadata associated with a face descriptor may also store other types of information such as the address of the person, health information for the person, telephone number, and other information related to the person. Other information may also be stored by the RFID tag. Several people may carry such RFID tags, each potentially storing a facial descriptor for the corresponding person and possibly associated metadata information.

Figure 4:
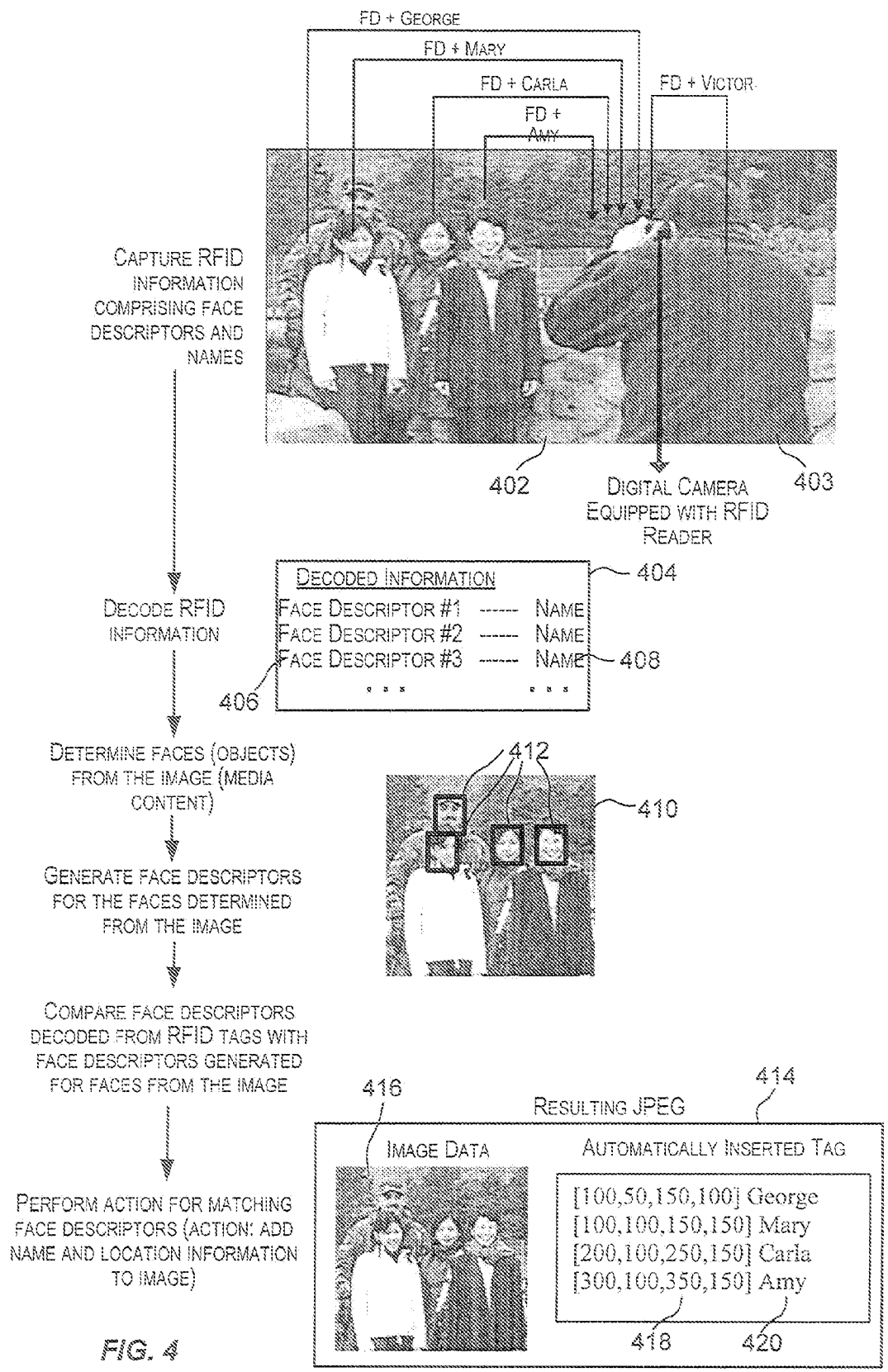
FIG. 4 depicts another example application of an embodiment of the present invention.

FIG. 4 depicts another application according to an embodiment of the present invention. In this example application, teachings of the present invention are used to analyze and automatically annotate a digital image. This example makes use of RFID tags that people may carry with them and may store information related to the person. As shown in scene 402 depicted in FIG. 4, a person 403 (named Victor) may use a digital camera to capture a photo of a group of people (with names George, Mary, Carla, and Amy as depicted in FIG. 4). The camera used by Victor 403 may be equipped with a long-range RFID reader that is capable of reading RFID information (i.e., machine readable identifier information) from RFID tags carried by people within a certain distance. Accordingly, when Victor uses the camera to capture a photo of the group, the camera may be configured to read RFID information from tags that are within communication range of the RFID reader on the camera. For example, the camera may read RFID information from tags carried or associated with people in proximity to the camera. For example, in scene 402 depicted in FIG. 4, the camera may read RFID information from tags of people (George, Mary, Carla, Amy) whose photo is being captured. The camera may also read information from RFIDs associated with other people that are within reading range of the camera RFID reader including information from the RFID tag of the person (e.g., Victor) taking the picture. An RFID tag for a person may store one or more object descriptors describing features of the person. For the example depicted in FIG. 4, it is assumed that the RFID tag for a person stores a face descriptor for the person and the associated metadata information specifies the person's name. The face descriptor may specify features of the person's face.

In alternative embodiments, other types of object descriptors describing features of a person may be stored in an RFID tag for a person. These object descriptors may then be used to identify persons from the media content.

The RFID information read by the camera from the RFID tags may then be decoded by the camera to form decoded information 404. Decoded information 404 may comprise a list of face descriptors 406 and associated metadata information 408 specifying names of the persons.

Photo image 410 captured by the digital camera serves as the media content that is analyzed. In one embodiment, the analysis of the captured photo image may be performed by the camera. The camera may determine a set of objects from the captured image. The objects in this application are faces 412 of people occurring in the captured image. For each face 412 determined from image 410, the spatial location of the face in the photograph may also be determined. In alternative embodiments, the spatial information for a face in the photograph may be determined at the time of performing an action for the face. Features may be extracted for the faces. The camera may then generate a face descriptor (object descriptor) for each face (object) determined from image 410.

The camera may then compare the face descriptors generated for the one or more faces determined from image 410 to face descriptors 406 decoded from information read from the RFID tags to find any matching object descriptors. As previously described, various different techniques may be used to perform the comparison and to determine whether two object descriptors are matching.

If a face descriptor for a face determined from image 410 is found to match a face descriptor 406 decoded from the RFID tags, it implies that a face in photo image 410 satisfies or matches the features specified by a face descriptor decoded or read from the RFID tags. Thus, a match indicates that a face described by a face descriptor decoded from information read from the RFID tags is found in the faces (objects) determined from the photo image.

An action may then be initiated or performed for each matching face descriptor generated for a face determined from image 410. In the example depicted in FIG. 4, for a matching face descriptor generated for a face determined from the image, information may be may be annotated to image 410. For example, as depicted in FIG. 4, four faces are determined from image 410 and the face descriptors generated for the faces match the face descriptors 406 decoded from information read from the RFID tags. For each face in the image whose face descriptor is found to be matching, a tag is automatically added to the image 410. In the example depicted in FIG. 4, the tag information added for a face comprises information 418 indicating the spatial coordinates of the face within image 410 and the name 420 of the person corresponding to the face. The name of the person is determined from metadata 408 associated with the matching object descriptor 406 decoded from information read from the RFID tags. As depicted in FIG. 4, tags for the four faces determined from image 410 have been added to the image.

The information may be added to the image in various ways. For example, a JPEG image 414 comprises image data 416 and also header information related to the image. The tag information for a face, including spatial coordinates information and the name, may be inserted in the header for the JPEG image. In another embodiment, image 410 may be annotated by adding information to the image data. For example, the name may be printed on top (or proximal to or partially overlapping) of the face corresponding to the name.

Other actions may also be performed. For example, for a particular face located in the image, the action performed may comprise associating a link with the face in the image, wherein selection of the link invokes information (e.g., a web page of the person, a document authored/edited/viewed by the person, etc.) related to the person.

According to an embodiment of the present invention, the processing depicted in FIG. 4 may be performed entirely by the digital camera that is used to capture the photo. In alternative embodiments, the processing may be performed by the camera in association with other systems or devices. Embodiments of the present invention thus enable applications involving automatic annotation of photos that combines use of RFID tags and object recognition. The object descriptors encoded in a machine readable identifier are used to determine the existence and/or location of an object in an image.

In the example depicted in FIG. 4 and described above, the objects correspond to faces. However, in alternative embodiments, the object descriptors decoded from a machine readable identifier may describe other parts of a person (which may include the whole person). Analysis of the image may include recognizing one or more persons in the image and recognizing one or more parts of a person and then generating descriptors for the recognized parts which are then used for the comparison.

As another example, a camera equipped with an RFID reader may be used to take capture an image of books placed on a bookshelf in a library Each book may be tagged with an RFID tags. A tag associated with a book may store the card catalog number that is printed on the spine of the book. The image may then be analyzed to identify card catalog numbers from the image. The spatial locations of books within the image may also be determined. The image may then be annotated with the card catalog numbers such that card numbers are assigned to individual books in the image.

Similar processing techniques may also be used for applications comprising a collection of things such as books, products, etc. For example, a camera equipped with an RFID reader may be used to capture an image of products on a shelf in a store. For example, the image may depict different brands of toothpastes. An RFID tag may be associated with each toothpaste and may store information specifying a toothpaste descriptor describing features of the toothpaste such as color histograms of the package, etc. Each RFID tag attached to a toothpaste may also store metadata information specifying a brand of the toothpaste (or other information such as product identification information). Based upon the information read from the RFID tags attached to the toothpastes, the image of the toothpastes may be analyzed to determine locations of individual toothpastes in the image. The image may then be annotated with correct brand names for the toothpastes at various locations in the image.

As previously described, teachings of the present invention may be used to determine occurrences of particular objects (described by information decoded from one or more machine readable identifiers) in media content and also to determine spatial locations of the particular objects. For example, an image may be captured of physical objects, and the image may then be analyzed, guided by information read from machine readable identifiers read for the physical objects, to determine the spatial locations of the physical objects within the image which in turn identifies to the spatial locations of the physical objects. Embodiments of the present invention may thus be used to determine spatial locations of physical objects.

Various different applications may require determination of spatial locations of physical objects. One solution for determining the spatial locations of physical objects is to attach RFID tags to the physical objects. A RFID reader grid may then be used to read information from the RFID tags and to determine the locations of the physical objects. A RFID reader grid however may not always be available. Further, the costs of creating such a grid may be prohibitive.

Embodiments of the present invention provide a simpler solution to the problem of determining the location of the physical objects. An RFID tag may be attached to each physical object. The RFID tag attached to a physical object may store information specifying an object descriptor. The object descriptor may describe features of the physical object. For example, an object descriptor may specify visually distinctive features of the physical object such as pictures, text, etc. printed on the token, color of the object, dimensions or basic shape of the object, a color histogram for the object, text features, etc. A camera equipped with an RFID reader may be used to capture an image of the physical objects. While capturing the image, the camera may also be configured to read information from RFID tags attached to the physical objects. The information read from the RFID tags may be decoded to determine object descriptors (and possibly metadata information) specifying features of the physical objects. Based upon the information objects descriptors, the image of the physical objects may be analyzed to determine one or more objects in the image and spatial locations of the objects determined from the image. Objects descriptors may be generated for the objects determined from the image. The objects descriptors generated for objects determined from the image may then be compared to objects descriptors decoded from information read from the RFID tags to identify matching object descriptors and associated spatial information. In this manner, the spatial positions of the physical objects may be determined from analyzing the image based upon information read from the RFID tags attached to the physical objects.

An example of an application where spatial locations of physical objects is determined is described in U.S. application Ser. No. 11/396,375 filed Mar. 31, 2006. In this applications, various actions are performed based upon spatial positions of media keys. Embodiments of the present invention may be used to determine the physical locations of the media keys.

The embodiments of the present invention described above assume that the object descriptors and the corresponding metadata information are decoded or extracted from one or more machine readable identifiers. In alternative embodiments, the object descriptors and the metadata may also be provided to the processing system, in which cases the processing system does not have to process machine readable identifiers. Rest of the processing may be performed as described above. For example, in the example depicted in FIG. 4, the face descriptors 406 and the metadata information 408 may be provided to the camera. In this case the camera need not have a RFID reader and the people need not carry RFID tags. The information provided to the camera may then be used as previously described.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A computer-implemented method comprising:
receiving, from a device, an image comprising a first person;
determining, from a machine readable identifier, a first face descriptor associated with the first person, the first face descriptor specifying a first set of facial features associated with the first person;
detecting a face in the image;
generating a second face descriptor for the face detected in the image by extracting a second set of facial features for the face detected in the image based on the first set of facial features specified in the first face descriptor;
determining whether the first person is in the image based on identifying whether the second face descriptor matches the first face descriptor;
determining metadata information associated with the first face descriptor from the machine readable identifier;
responsive to identifying that the second face descriptor matches the first face descriptor,
determining a spatial location of the first person in the image and an action to be performed on the image, the action specified by the metadata associated with the machine readable identifier; and
performing the action including adding a portion of the metadata information to the image at a location proximal to or overlapping with the spatial location of the first person in the image; and
responsive to identifying that the second face descriptor fails to match the first face descriptor, sending a message indicating that the first person associated with the first face descriptor is not in the image.

2. The method of claim 1 further comprising:
adding the portion of the metadata information determined from the machine readable identifier to a header of an image file associated with the image.

3. The method of claim 1 further comprising adding a marker to the image, wherein selection of the marker invokes information related to the first person.

4. The method of claim 3 wherein the action is inherent or automatically determined from the metadata associated with the machine readable identifier.

5. The method of claim 1 wherein performing the action comprises annotating the image.

6. The method of claim 1 further comprising determining, from the machine readable identifier, a user identifier associated with the first face descriptor, and wherein performing the action comprises adding, to the image, information indicative of the spatial location of the first person in the image, and adding the user identifier associated with the first face descriptor to the image.

7. The method of claim 1 wherein the machine readable identifier is in a form of a barcode including a quick response (QR) code.

8. The method of claim 1 further comprising receiving digital media content comprising textual information, audio information or video information, determining a match between object descriptors decoded from the machine readable identifier and object descriptors generated for objects determined from the digital media content, and performing one or more actions based on the match.

9. The method of claim 1 wherein determining the first face descriptor from the machine readable identifier comprises decoding the machine readable identifier to identify the first face descriptor.

10. The method of claim 1 wherein the image comprises a second person and further comprising:
determining, from the machine readable identifier, a third face descriptor specifying a third set of facial features associated with the second person;
detecting a second face in the image;
generating a fourth face descriptor for the second face detected in the image; and
determining that the second person is in the image based on identifying that the third face descriptor matches the fourth face descriptor.

11. The method of claim 1 wherein the machine readable identifier is a radio frequency identifier (RFID) tag and wherein determining the first face descriptor from the machine readable identifier comprises:
reading information from the RFID tag using an RFID reader; and
determining the first face descriptor from the information read from the RFID tag.

12. The method of claim 1 wherein the first face descriptor is represented in MPEG-7 format.

13. The method of claim 1 further comprising determining, from the machine readable identifier, an object descriptor that specifies a feature from another part of the first person.

14. The method of claim 1 wherein detecting the face in the image comprises analyzing the image for the first set of facial features specified by the first face descriptor.

15. The method of claim 1, wherein identifying that the second face descriptor matches the first face descriptor comprises:
calculating a metric for the face detected in the image, the metric providing a measure of similarity between the second face descriptor and the first face descriptor; and
comparing the metric against a threshold to determine whether the second face descriptor associated with the metric matches the first face descriptor.

16. A system comprising:
a reader adapted to read a machine readable identifier;
one or more processors; and
one or more modules stored on a memory and executable by the one or more processors,
the one or more modules configured to:
receive, from a device, an image comprising a first person;
determine, from the machine readable identifier, a first face descriptor associated with the first person, the first face descriptor specifying a first set of facial features associated with the first person;
detect a face in the image;
generate a second face descriptor for the face detected in the image by extracting a second set of facial features for the face detected in the image based on the first set of facial features specified in the first face descriptor;
determine whether the first person is in the image based on identifying whether the second face descriptor matches the first face descriptor;
determine metadata information associated with the first face descriptor from the machine readable identifier;
responsive to identifying that the second face descriptor matches the first face descriptor,
determine a spatial location of the first person in the image and an action to be performed on the image, the action specified by the metadata associated with the machine readable identifier; and
perform the action including adding a portion of the metadata information to the image at a location proximal to or overlapping with the spatial location of the first person in the image; and
responsive to identifying that the second face descriptor fails to match the first face descriptor, send a message indicating that the first person associated with the first face descriptor is not in the image.

17. A computer program product comprising a non-transitory computer useable medium including a computer readable program, wherein the computer readable program when executed on a computer causes the computer to:
receive, from a device, an image comprising a first person;
determine, from a machine readable identifier, a first face descriptor associated with the first person, the first face descriptor specifying a first set of facial features associated with the first person;
detect a face in the image;
extract a second set of facial features for the face detected in the image based on the first set of facial features specified in the first face descriptor;
generate a second face descriptor for the face detected in the image based on the second set of facial features;
determine whether the first person is in the image based on identifying whether the second face descriptor matches the first face descriptor;
determine metadata information associated with the first face descriptor from the machine readable identifier;
responsive to identifying that the second face descriptor matches the first face descriptor,
determine a spatial location of the first person in the image and an action to be performed on the image, the action specified by the metadata associated with the machine readable identifier; and
perform the action including adding a portion of the metadata information to the image at a location proximal to or overlapping with the spatial location of the first person in the image; and
responsive to identifying that the second face descriptor fails to match the first face descriptor, send a message indicating that the first person associated with the first face descriptor is not in the image.

* * * * *